United States Patent
Park

(10) Patent No.: US 10,917,734 B2
(45) Date of Patent: Feb. 9, 2021

(54) ELECTRONIC DEVICE FOR CONTROLLING SPEAKER AND OPERATING METHOD THEREOF

(71) Applicant: Samsung Electronics Co., Ltd., Suwon-si (KR)

(72) Inventor: Ji-Soon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/845,320

(22) Filed: Dec. 18, 2017

(65) Prior Publication Data

US 2018/0176707 A1    Jun. 21, 2018

(30) Foreign Application Priority Data

Dec. 19, 2016  (KR) .......................... 10-2016-0173440

(51) Int. Cl.
| | |
|---|---|
| *H04S 7/00* | (2006.01) |
| *G06F 3/0484* | (2013.01) |
| *H04R 3/12* | (2006.01) |
| *G06F 3/0481* | (2013.01) |

(52) U.S. Cl.
CPC .............. *H04S 7/30* (2013.01); *G06F 3/0481* (2013.01); *G06F 3/0484* (2013.01); *H04R 3/12* (2013.01); *H04S 7/303* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 4,866,776 A | * | 9/1989 | Kasai | ............... H04R 5/02 381/302 |
| 8,019,454 B2 | * | 9/2011 | Haulick | ............ G01C 21/3629 700/94 |
| 9,301,077 B2 | * | 3/2016 | Hampiholi | ............. G06F 3/165 |
| 9,319,019 B2 | * | 4/2016 | Selig | ..................... G06F 3/165 |
| 2005/0123143 A1 | | 6/2005 | Platzer et al. | |
| 2005/0271219 A1 | | 12/2005 | Bruelle-Drews | |
| 2008/0273714 A1 | | 11/2008 | Hartung | |
| 2009/0055178 A1 | | 2/2009 | Coon | |
| 2012/0321099 A1 | | 12/2012 | Eichfeld et al. | |

(Continued)

FOREIGN PATENT DOCUMENTS

| | | |
|---|---|---|
| CN | 1701520 A | 11/2005 |
| CN | 101682813 A | 3/2010 |

(Continued)

OTHER PUBLICATIONS

European Search Report dated Jul. 22, 2019; European Appln. No. 17883585.6-1207 / 3504885 PCT/KR2017015009.

(Continued)

*Primary Examiner* — Paul W Huber
(74) *Attorney, Agent, or Firm* — Jefferson IP Law, LLP

(57) ABSTRACT

An electronic device for controlling a speaker and an operating method thereof are provided. The electronic device includes an audio output apparatus, and a processor configured to, according to a type of a first sound source to be output through the audio output apparatus, control an output of the audio output apparatus to output a first sound corresponding to the first sound source so as to be focused on a first area.

17 Claims, 18 Drawing Sheets

(56) References Cited

U.S. PATENT DOCUMENTS

2015/0189438 A1  7/2015  Hampiholi et al.
2016/0165031 A1  6/2016  Gopinath

FOREIGN PATENT DOCUMENTS

| CN | 105873799 A | 8/2016 |
|---|---|---|
| CN | 105933822 A | 9/2016 |
| EP | 1 860 918 A1 | 11/2007 |
| EP | 3 089 892 A1 | 11/2016 |
| JP | 5724125 B2 | 5/2015 |
| KR | 20-2008-0005036 U | 10/2008 |
| KR | 10-2014-0128185 A | 11/2014 |
| WO | 2014-115964 A1 | 7/2014 |
| WO | 2015/103019 A1 | 7/2015 |

OTHER PUBLICATIONS

European Search Report dated Feb. 20, 2020; European Appln. No. 17 883 585.6-1207.
Zhen et al.; Investigation on the robustness of acoustic focusing algorithm using small-scale loudspeaker array under scattering condition; Journal of Nanjing University (Natural Sciences); vol. 52, No. 2; Mar. 2016.
Chinese Office Action with English translation dated Aug. 31, 2020; Chinese Appln. No. 201780077940.2.

* cited by examiner

| AREA | WEIGHT FOR EACH SPEAKER | | | |
|---|---|---|---|---|
| | A | B | C | D |
| 1 | 3.5 | 0.5 | 0 | 0 |
| 2 | 1.5 | 1.5 | 0.5 | 0.5 |
| 3 | 1.0 | 1.0 | 1.0 | 1.0 |
| 4 | 0 | 0 | 0.5 | 3.5 |

ELECTRONIC DEVICE FOR CONTROLLING SPEAKER AND OPERATING METHOD THEREOF

CROSS-REFERENCE TO RELATED APPLICATION(S)

This application claims the benefit under 35 U.S.C. § 119(a) of a Korean patent application filed on Dec. 19, 2016 in the Korean Intellectual Property Office and assigned Serial number 10-2016-0173440, the entire disclosure of which is hereby incorporated by reference.

TECHNICAL FIELD

The present disclosure relates to an electronic device for controlling a speaker and an operating method thereof. More particularly, the present disclosure relates to an electronic device for controlling an audio output apparatus to output a sound of a sound source so as to be focused on an area including a target listener appropriate for a sound source type, and an operating method thereof.

BACKGROUND

Recently, with the advancement of electronic communication technology, a large number of electronic devices are mounted within a vehicle. Accordingly, recently, vehicle audio output apparatuses have attracted people's attention and have been actively developed.

An audio output apparatus according to the related art outputs a sound through a speaker regardless of a sound source type. In addition, the audio output apparatus according to the related art outputs a sound regardless of the location of a user who listens to the sound. For example, the existing audio output apparatus outputs a sound regardless of the sound source type and the locations of subjects listening to a sound who are in a predetermined space.

For example, when a particular subject listens to a sound through the audio output apparatus, even other subjects who do not need to listen to the sound are forced to hear the sound. In addition, even when a user who listens to a sound through the audio output apparatus is not a driver, the driver hears the sound, and thus, there is a concern that the driver may not be able to concentrate on driving.

Therefore, a need exists for an electronic device for controlling an audio output apparatus to output a sound of a sound source so as to be focused on an area including a target listener appropriate for a sound source type, and an operating method thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for controlling an audio output apparatus to output a sound of a sound source so as to be focused on an area including a target listener appropriate for a sound source type, and an operating method thereof.

In accordance with an aspect of the present disclosure, an electronic device is provided. The electronic device includes an audio output apparatus, and a processor configured to, according to a type of a first sound source to be output through the audio output apparatus, control an output of the audio output apparatus to output a first sound corresponding to the first sound source so as to be focused on a first area.

In accordance with another aspect of the present disclosure, an operating method of an electronic device is provided. The method includes determining a type of a first sound source to be output through an audio output apparatus, and controlling an output of the audio output apparatus to output a first sound corresponding to the first sound source so as to be focused on a first area, according to the determined type of the first sound source.

In accordance with another aspect of the present disclosure, an electronic device is provided. The electronic device includes a communication device, and a processor configured to transmit, through the communication device, a control signal for, according to a type of a first sound source to be output through an audio output apparatus, controlling an output of the audio output apparatus to output a first sound corresponding to the first sound source so as to be focused on a first area.

The electronic device, according to an embodiment of the present disclosure, can control the audio output apparatus to output a sound so as to be focused on a particular area, according to a sound source type, and thus, can output a sound so as to be focused on a particular target listener according to the sound source type.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 11A and 11B illustrate an operation of an electronic device for controlling each of multiple speakers according to various embodiments of the present disclosure;

The same reference numerals are used to represent the same elements throughout the drawings.

DETAILED DESCRIPTION

Figure 1:
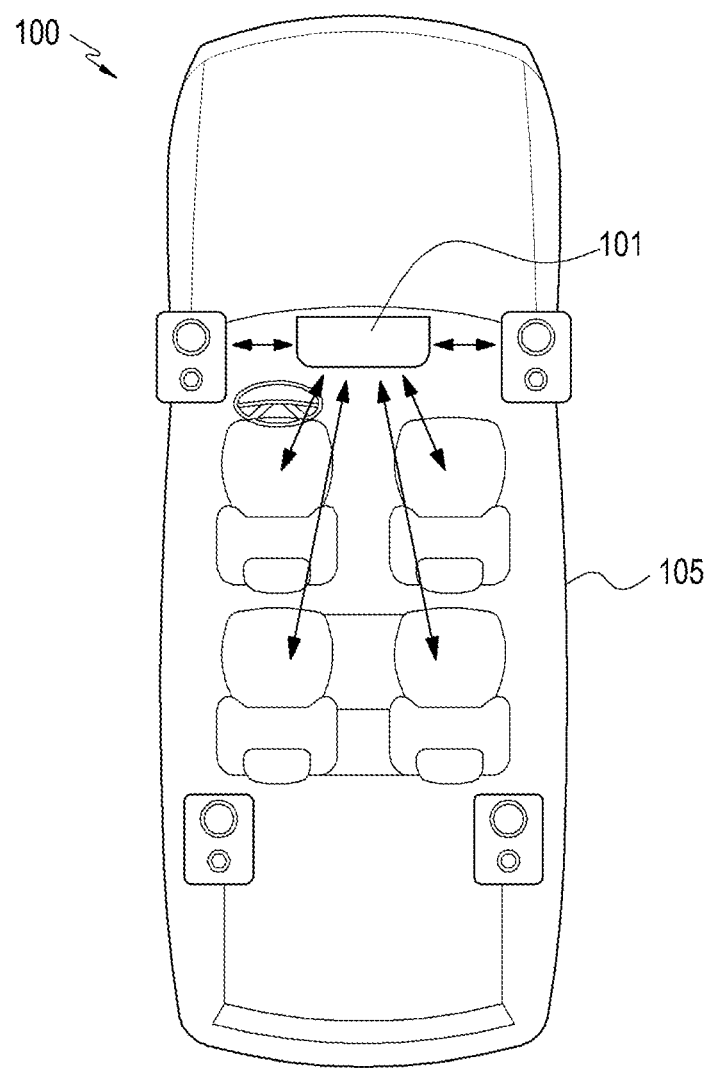
FIG. 1 is a schematic block diagram of an electronic system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the singular forms may include the plural forms as well, unless the context clearly indicates otherwise. In an embodiment of the present disclosure, the expression "A or B" or "at least one of A and/or B" may include all possible combinations of the items listed. The expression "a first", "a second", "the first", or "the second" may modify corresponding elements regardless of the order or importance thereof, and is used only to distinguish one element from another element, but does not limit the corresponding elements. When an element (e.g., a first element) is referred to as being (operatively or communicatively) "connected" or "coupled" to another element (e.g., a second element), the element may be connected directly to the other element or connected to the another element through any other element (e.g., a third element).

In an embodiment of the present disclosure, the expression "configured to" may be exchanged with, for example, "suitable for", "having the capacity to", "adapted to", "made to", "capable of", or "designed to" in terms of hardware or software, according to the circumstances. In some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a general-purpose processor (e.g., a central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, a medical device, a camera, and a wearable device. According to various embodiments of the present disclosure, the wearable device may include at least one of an accessory type (e.g., a watch, a ring, a bracelet, an anklet, a necklace, glasses, a contact lens, or a head-mounted device (HMD)), a fabric- or clothing-integrated type (e.g., an electronic clothing), a body-mounted type (e.g., a skin pad or tattoo), and a bio-implantable type (e.g., an implantable circuit). According to some embodiments of the present disclosure, the electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA) device, a magnetic resonance imaging (MRI) device, a computed tomography (CT) machine, and an ultrasonic machine), a navigation device, a global navigation satellite system (GNSS), an event data recorder (EDR), a flight data recorder (FDR), a vehicle infotainment device, electronic devices for a ship (e.g., a navigation device for a ship, a gyro-compass, and the like), avionics, security devices, an automotive head unit, a robot for home or industry, a drone, an automated teller machine (ATM) in banks, a point-of-sales (POS) terminal in a shop, and an Internet-of-Things device (e.g., a light bulb, various sensors, a sprinkler device, a fire alarm, a thermostat, a streetlamp, a toaster, sporting goods, a hot water tank, a heater, a boiler, and the like). According to some embodiments of the present disclosure, the electronic device may include at least one of a part of a piece of furniture, a building/structure, or a motor vehicle, an electronic board, an electronic signature receiving device, a projector, and various kinds of measuring instruments (e.g., a water meter, an electric meter, a gas meter, and a radio wave meter). In various embodiments of the present disclosure, the electronic device may be flexible, or may be a combination of two or more of the aforementioned various devices. The electronic device according to an embodiment of the present disclosure is not limited to the aforementioned devices. In an embodiment of the present disclosure, the term "user" may indicate a person using an electronic device or a device (e.g., an artificial intelligence electronic device) using an electronic device.

The term "module" as used herein may include a unit implemented in hardware, software, or firmware, and for example, may be used interchangeably with the term "logic", "logical block", "component", "circuit", or the like. The "module" may be an integrated component, or a minimum unit for performing one or more functions or a part thereof. The "module" may be mechanically or electronically implemented, and may include, for example, an application-specific integrated circuit (ASIC) chip, a field-programmable gate array (FPGA), or a programmable logic device which performs certain operations and is already known or is to be developed in the future.

At least part of the device (e.g., modules or functions thereof) or the method (e.g., operations) according to various embodiments of the present disclosure may be implemented by an instruction which is stored in a computer-readable storage medium (e.g., the memory) in the form of a program module. When the instruction is executed by a processor (e.g., the processor), the processor may perform a function corresponding to the instruction. Examples of the computer-readable recoding medium may include: magnetic media, such as a hard disk, a floppy disk, and a magnetic tape, optical media, such as a compact disc read only memory (CD-ROM) and a digital versatile disc (DVD), magneto-optical media, such as a floptical disk, an internal memory, and the like. The instructions may include a code made by a compiler or a code which can be executed by an interpreter. The module or program module according to various embodiments of the present disclosure may include at least one of the aforementioned elements, may further include other elements, or some of the aforementioned elements may be omitted from the module or program module. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

FIG. 1 is a schematic block diagram of an electronic system according to an embodiment of the present disclosure.

Referring to FIG. 1, an electronic system 100 may include a first electronic device 101 mounted in a particular space 105. For example, the particular space 105 may signify an interior space of a house, an office, a train, an automobile, an airplane, and/or a boat.

According to an embodiment of the present disclosure, the electronic system 100 may provide a sound to a listener through the first electronic device 101 mounted in the particular space 105.

According to the type of a sound source to be output through an audio output apparatus, the first electronic device 101 may control an output of an audio output apparatus to output a sound corresponding to the sound source so as to be focused (concentrate an emphasized sound) on a predetermined area within the particular space 105.

For example, the first electronic device 101 may control the output intensity of each of speakers included in the audio output apparatus to output a sound corresponding to a sound source so as to be focused on a predetermined area within the particular space 105. For example, the first electronic device 101 may control the output intensity of the audio output apparatus (or speakers of the audio output apparatus) so as to enable a listener to focus (put an emphasis) on listening to a sound corresponding to a sound source in a predetermined area within the particular space 105.

The first electronic device 101 may determine an area to which a sound corresponding to a sound source is to be intensively output through the audio output apparatus, based on a sound source type and the location of a user. In addition, the first electronic device 101 may output a sound so as to be focused on the determined area.

For example, the first electronic device 101 may determine, through a sensor, whether a user is riding in an automobile. The first electronic device 101 may determine whether the user is riding in the automobile, based on a sensing signal detected by the sensor included in a seat. In this case, the sensor may include a pressure sensor and/or a weight sensor.

In addition, the first electronic device 101 may output, through the audio output apparatus, a sound to an area in which the user detected by the sensor is located.

Figure 2A:
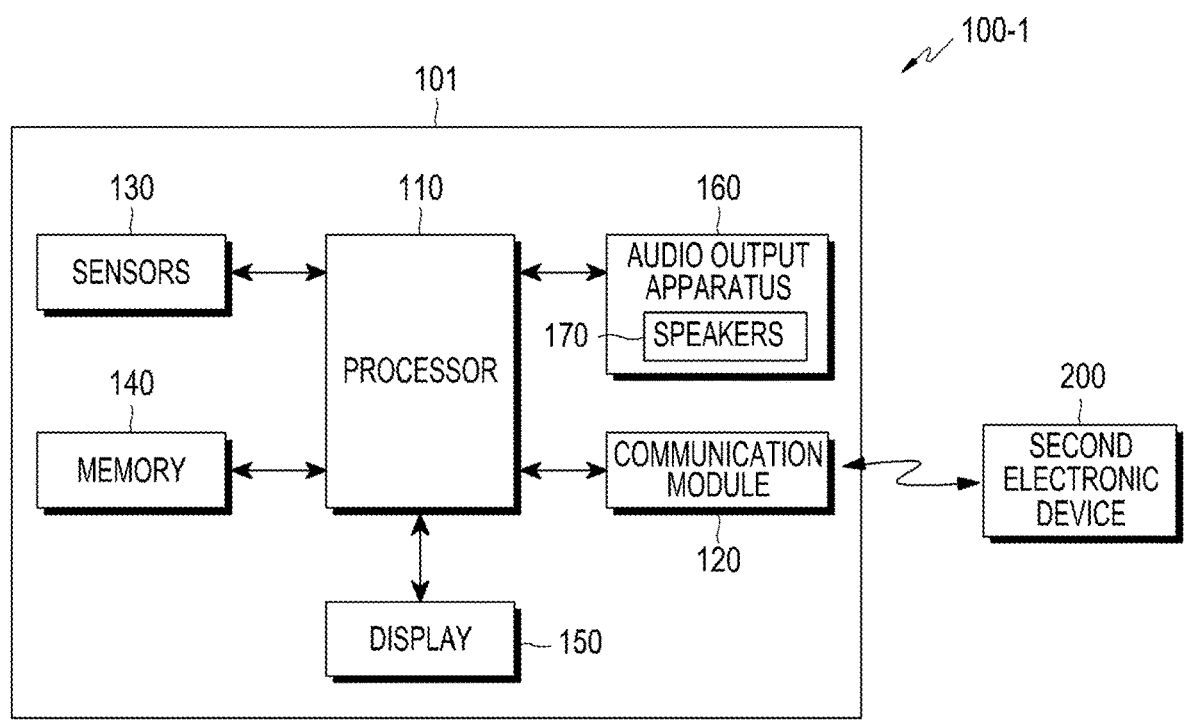
FIGS. 2A and 2B are block diagrams each illustrating a configuration of an electronic system according to various embodiments of the present disclosure.
Figure 2B:
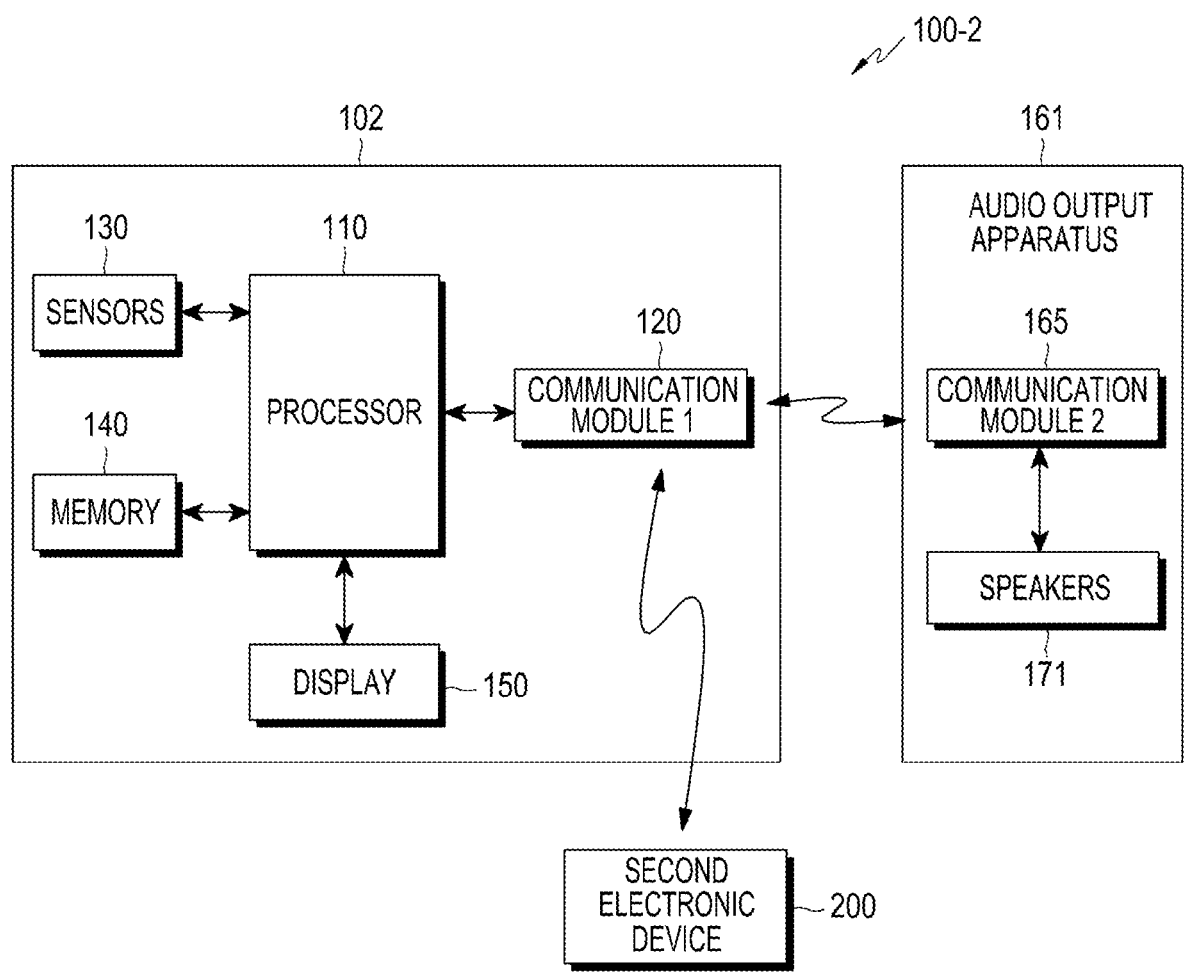

FIGS. 2A and 2B are block diagrams each illustrating a configuration of an electronic system according to various embodiments of the present disclosure.

Referring to FIG. 2A, an electronic system 100-1 may be implemented to be substantially identical or similar to the electronic system 100 illustrated in FIG. 1.

The electronic system 100-1 may include the first electronic device 101 and a second electronic device 200.

The first electronic device 101 may include a processor 110, a communication module 120, multiple sensors 130, a memory 140, a display 150, and an audio output apparatus 160.

The processor 110 may control an overall operation of the first electronic device 101.

For example, the processor 110 may include one or more of a CPU, an AP, and a communication processor (CP). The processor 110 may perform, for example, calculations or data processing related to control over and/or communication by at least one of the other elements of the first electronic device 101.

According to an embodiment of the present disclosure, according to the type of a sound source to be output through the audio output apparatus 160, the processor 110 may control an output of the audio output apparatus 160 to output a sound corresponding to the sound source so as to be focused on a first area.

The processor 110 may determine a first area to which a sound is to be intensively output, according to a sound source type. In addition, the processor 110 may control the output intensity of the audio output apparatus 160 in relation to the determined first area. For example, the processor 110 may adjust the output intensity (or a weight of the output intensity) of each of multiple speakers 170 included in the audio output apparatus 160 so as to focus a sound on the determined first area.

According to an embodiment of the present disclosure, the processor 110 may analyze metadata of a sound source, and may determine a sound source type according to a result of the analysis. In addition, the processor 110 may determine a sound source type according to a location at which the sound source is stored.

For example, the types of sound source may include audio, radio, navigation, telephone call, and digital multimedia broadcasting (DMB). Here, a sound source may include a sound source stored in the first electronic device 101 and/or a sound source stored in an external electronic device (e.g., the second electronic device 200 and/or a server (not illustrated)).

According to an embodiment of the present disclosure, the processor 110 may determine an area, in which the second electronic device 200 accessed through the communication module 120 is located, as a first area. Alternatively, the processor 110 may determine a first area based on the location of a sensor having detected a sensing signal among the multiple sensors 130. At this time, the processor 110 may determine an area, which corresponds to an average location of sensors having detected sensing signals among the multiple sensors 130, as the first area.

Meanwhile, the processor 110 may compare a sensing value of a sensor, which has detected a sensing signal among the multiple sensors 130, with a preset reference value, and determine a first area according to a result of the comparison.

For example, the first area may signify an area to which a sound is intensively output in the particular space 105. The first area may be automatically or manually determined by the processor 110.

When multiple sound sources are to be output through the audio output apparatus 160, according to the type of first sound source, the processor 110 may cause a first speaker of the audio output apparatus 160 to output a first sound so as to be focused on the first area. In addition, according to the type of second sound source, the processor 110 may cause a second speaker of the audio output apparatus 160 to output a second sound so as to be focused on a second area different from the first area. For example, the first sound may signify a sound corresponding to the first sound source, and the second sound may signify a sound corresponding to the second sound source.

According to the control of the processor 110, the communication module 120 may perform a communication function with the second electronic device 200. In addition, according to the control of the processor 110, the communication module 120 may perform a communication function with a server (not illustrated).

According to an embodiment of the present disclosure, the communication module 120 may perform a communication function with the second electronic device 200 by using wireless communication technology.

For example, the types of wireless communication may include cellular communication which uses at least one of long-term evolution (LTE), LTE-Advanced (LTE-A), code division multiple access (CDMA), wideband CDMA (WCDMA), universal mobile telecommunications system (UMTS), WiBro (Wireless Broadband), and global system for mobile communications (GSM). According to an embodiment of the present disclosure, the types of wireless communication may include at least one of, for example, Wi-Fi, Bluetooth, Bluetooth Low Energy (BLE), ZigBee, near field communication (NFC), magnetic secure transmission, radio frequency (RF), and body area network (BAN). According to an embodiment of the present disclosure, the types of wireless communication may include a GNSS. The GNSS may be, for example, a global positioning system (GPS), a global navigation satellite system (GLONASS), a BeiDou Navigation Satellite System (hereinafter "BeiDou"), or a european global satellite-based navigation system (Galileo). Hereinafter, in an embodiment of the present disclosure, the term "GPS" may be used interchangeably with the term "GNSS." The types of wired communication may include at least one of, for example, a universal serial bus (USB), a high definition multimedia interface (HDMI), recommended standard 232 (RS-232), power line communication (PLC), and a plain old telephone service (POTS). The network 162 may include at least one of telecommunication networks, such as a computer network (e.g., a local area network (LAN) or a wide area network (WAN)), the Internet, and a telephone network.

For example, the communication module 120 may include the cellular module, a Wi-Fi module, a BT module, a GNSS module, an NFC module, and an RF module. For example, the cellular module may provide a voice call, a video call, a text message service, an Internet service, and the like through a communication network. According to an embodiment of the present disclosure, the cellular module may identify or authenticate the first electronic device 101 in the communication network by using the subscriber identification module (e.g., a subscriber identity module (SIM) card). According to an embodiment of the present disclosure, the cellular module may perform at least some of the functions that the processor 110 may provide. According to an embodiment of the present disclosure, the cellular module may include a CP. According to some embodiments of the present disclosure, at least some (e.g., two or more) of the cellular module, the Wi-Fi module, the BT module, the GNSS module, and the NFC module may be included in one integrated chip (IC) or IC package. The RF module may transmit and receive, for example, communication signals (e.g., RF signals). The RF module may include, for example, a transceiver, a power amplifier module (PAM), a frequency filter, a low noise amplifier (LNA), and an antenna. According to another embodiment of the present disclosure, at least one of the cellular module, the Wi-Fi module, the BT module, the GNSS module, and the NFC module may transmit and receive RF signals through a separate RF module. The subscriber identification module may include, for example, a card including a subscriber identity module or an embedded SIM, and may contain unique identification information (e.g., an integrated circuit card identifier (IC-CID)) or subscriber information (e.g., an international mobile subscriber identity (IMSI)).

According to an embodiment of the present disclosure, the communication module 120 may include a beacon terminal. Here, the beacon terminal may output a beacon signal. The communication module 120 may perform a communication function with the second electronic device 200 responding to a beacon signal output from the beacon terminal.

The multiple sensors 130 may detect the location of a user. In addition, the multiple sensors 130 may detect the location of the user, and may transmit a detection signal (or a sensing signal) to the processor 110.

For example, the multiple sensors 130 may each be implemented as identical or different sensors.

For example, each of the multiple sensors 130 may measure a physical quantity or detect an operation state of the first electronic device 101, and may convert the measured physical quantity or the detected operation state into an electrical signal. Each of the multiple sensors 130 may include at least one of, for example, a pressure sensor, a weight sensor, a gesture sensor, a gyro sensor, an atmospheric pressure sensor 240C, a magnetic sensor, an acceleration sensor, a grip sensor 240F, a proximity sensor, a color sensor (e.g., a Red-Green-Blue (RGB) sensor), a biometric sensor, a temperature/humidity sensor, an illuminance sensor, and an ultraviolet (UV) sensor. The multiple sensors 130 may further include a control circuit for controlling at least one sensor included therein. In some embodiments of the present disclosure, the first electronic device 101 may further include a processor configured to control each of the multiple sensors 130 as a part of or separately from the processor 110, and may control each of the multiple sensors 130 while the processor 110 is in a sleep state.

According to an embodiment of the present disclosure, each of the multiple sensors 130 may be located at a place allowing the detection of the location of the user in the particular space 105. For example, each of the multiple sensors 130 may be mounted to a means (e.g., a chair) for allowing the user to sit down.

Meanwhile, the multiple sensors 130 are illustrated as being included in the first electronic device 101 in FIG. 2A, but may be provided separately from the first electronic device 101. Here, the multiple sensors 130 may transmit a detection signal (or a sensing signal) to the processor 110 through the communication module 120.

The memory 140 may store data related to the first electronic device 101. For example, the memory 140 may implemented by a volatile memory or a non-volatile memory.

For example, the memory 140 may include at least one of, for example, a volatile memory (e.g., a dynamic random access memory (DRAM), a static RAM (SRAM), a synchronous DRAM (SDRAM), and the like), and a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory, a hard drive, and a solid state drive (SSD)).

According to an embodiment of the present disclosure, under the control of the processor 110, the memory 140 may store a sound source to be output through the audio output apparatus 160. In addition, the memory 140 may store information on an area (e.g., a weight of the output of a speaker to an area) to which the audio output apparatus 160 intensively outputs a sound.

According to the control of the processor 110, the display 150 may display information on the first electronic device. For example, the display 150 may display information on a sound source which is output through the audio output apparatus 160. In addition, the display 150 may display information on an area to which a sound corresponding to the sound source is intensively output through the audio output apparatus 160.

Examples of the display 150 may include a liquid crystal display (LCD), a light-emitting diode (LED) display, an organic light-emitting diode (OLED) display, a micro-electro-mechanical systems (MEMS) display, and an electronic paper display. For example, the display 150 may display various pieces of content (e.g., text, images, videos, icons, symbols, and/or the like.) to the user. The display 150 may include a touch screen, and may receive, for example, a touch input, a gesture input, a proximity input, or a hovering input provided by an electronic pen or a body part of the user.

According to an embodiment of the present disclosure, the display 150 may display a user interface (UI). In addition, the display 150 may receive a touch input, and may transmit information on the received touch input to the processor 110.

According to the control of the processor 110, the audio output apparatus 160 may output a sound corresponding to a sound source. In addition, the audio output apparatus 160 may output a sound corresponding to a sound source so as to be focused on a particular area.

For example, the audio output apparatus 160 may signify an apparatus that outputs a sound or controls the output of a sound.

The audio output apparatus 160 may include the multiple speakers 170. For example, the audio output apparatus 160 may control an output (or the intensity of an output) of each of the multiple speakers 170 to output a sound corresponding to a sound source so as to be focused on a particular area.

For example, the audio output apparatus 160 may bidirectionally convert between a sound and an electrical signal. The audio output apparatus 160 may process sound information which is input or output through, for example, multiple speakers 170, a receiver, an earphone, a microphone, or the like.

The second electronic device 200 may perform a communication function with the first electronic device 101 by using wireless communication technology. For example, the second electronic device 200 may signify a device performing a communication function, including a smart phone, a wearable device, a tablet PC, a PC, a laptop computer, and/or a terminal.

According to an embodiment of the present disclosure, the second electronic device 200 may perform a particular function through the first electronic device 101. For example, the second electronic device 200 may perform a telephone call function through the first electronic device 101. In addition, the second electronic device 200 may perform a function of reproducing a sound source stored in the second electronic device 200 through the first electronic device 101. Meanwhile, the second electronic device 200 may perform a function of reproducing a sound source, which the second electronic device 200 receives through a server (not illustrated), through the first electronic device 101.

Referring to FIG. 2B, the electronic system 100-2 may be implemented to be substantially identical or similar to the electronic system 100-1 described with reference to FIG. 2A.

Except for the audio output apparatus 160 of the first electronic device 101 described with reference to FIG. 2A, a first electronic device 102 may be implemented to be substantially identical or similar to the first electronic device 101.

An audio output apparatus 161 may include a second communication module 165 and multiple speakers 171.

The second communication module 165 may perform a communication function with a communication module 120 by using the wireless communication technology described with reference to FIG. 2A.

For example, the audio output apparatus 161 may receive a control signal from the first electronic device 102 through the second communication module 165. According to the control of the first electronic device 102, the audio output apparatus 161 may output a sound corresponding to a sound source. In addition, the audio output apparatus 161 may output a sound corresponding to a sound source so as to be focused on a particular area.

For example, the audio output apparatus 161 may signify an apparatus that outputs a sound or controls the output of a sound. In addition, the audio output apparatus 161 may be implemented as an apparatus separated from the first electronic device 102.

The audio output apparatus 161 may include the multiple speakers 171. For example, the audio output apparatus 161 may control an output (or the intensity of an output) of each of the multiple speakers 171 to output a sound corresponding to a sound source so as to be focused on a particular area.

Figure 3:
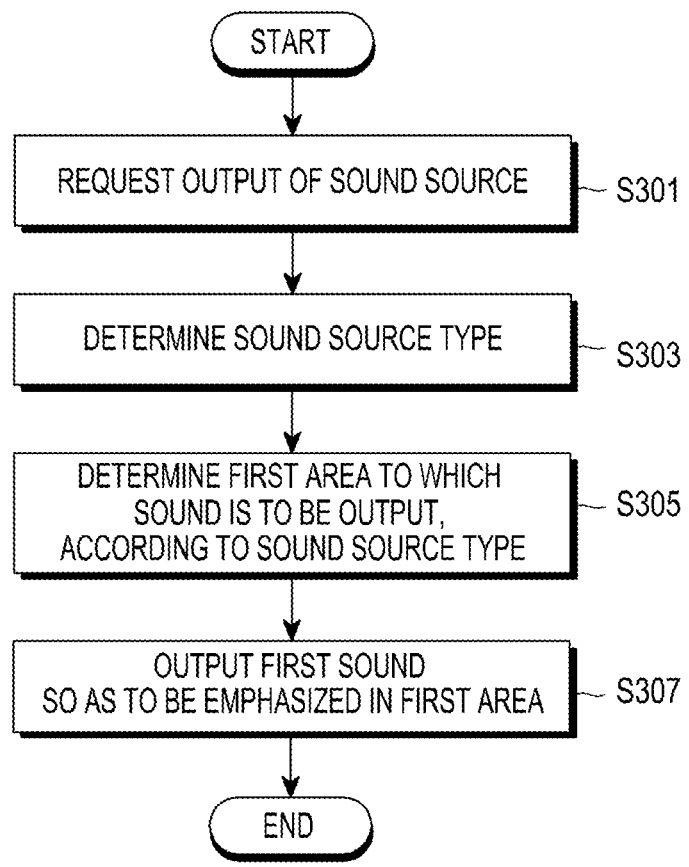
FIG. 3 is a flowchart illustrating an operating method of an electronic device according to various embodiments of the present disclosure.

FIG. 3 is a flowchart illustrating an operating method of an electronic device according to various embodiments of the present disclosure.

Referring to FIG. 3, in operation S301, the processor 110 may request the output of a sound source. For example, in response to a user input, the processor 110 may request the output of a sound source.

In operation S303, the processor 110 may determine the type of a sound source of which the output has been requested. For example, the processor 110 may analyze metadata of the sound source, and may determine a sound source type according to a result of the analysis. In addition, the processor 110 may determine a sound source type based on a location at which the sound source is stored.

In operation S305, according to the sound source type, the processor 110 may determine a first area to which a sound is to be output. For example, according to the sound source type, the processor 110 may determine a first area corresponding to the location of a subject (or a user) that is to listen to a sound in a particular space 105. For example, when the sound source type is useful to at least one user within the particular space 105, the processor 110 may determine the location of the at least one user.

According to an embodiment of the present disclosure, when a sound source type is a navigation type, the processor 110 may determine a first area to which a navigation voice is to be intensively output. At this time, the first area may be an area corresponding to a front part (e.g., a part in front of a driver's seat of an automobile) within a particular space (e.g., an interior space of the automobile) so as to enable a user to listen to a navigation voice.

Alternatively, when a sound source type is a telephone call type, the processor 110 may determine a first area to which a telephone call voice is to be intensively output. At this time, the first area may be an area corresponding to the location of the second electronic device 200 connected to the communication module 120 in order to perform a telephone call function.

Alternatively, when a sound source type is an audio type, the processor 110 may determine a first area to which an audio-type sound is to be intensively output. At this time, the first area may be an area corresponding to a central part within a particular space (e.g., an interior space of an automobile) so as to enable all users to listen to an audio-type sound.

In operation S307, the processor 110 may output a first sound through the audio output apparatus 160 or 161 so as to be focused on the first area. For example, the processor 110 may control the output intensity of each of the multiple speakers 170 or 171 included in the audio output apparatus 160 or 161 to output the first sound so as to be focused on the first area.

Figure 4:
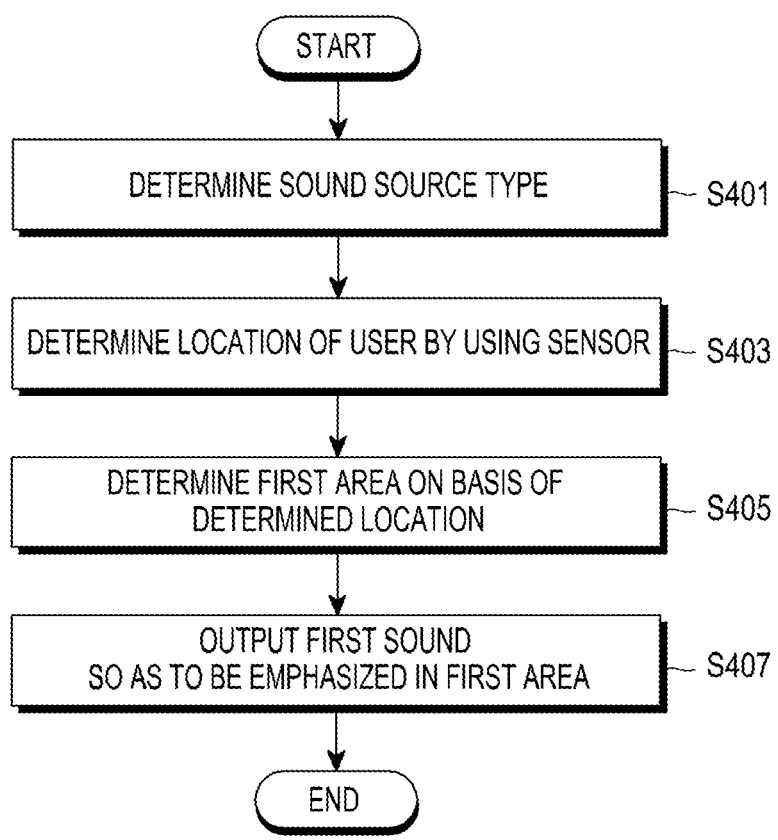
FIG. 4 is a flowchart illustrating an operating method of an electronic device according to various embodiments of the present disclosure.

FIG. 4 is a flowchart illustrating an operating method of an electronic device according to various embodiments of the present disclosure.

Referring to FIG. 4, in operation S401 the processor 110 may determine the type of a sound source to be output through the audio output apparatus 160 or 161.

The processor 110 may determine the location of a listener, for the determined sound source type. For example, the processor 110 may determine whether a sound source is of a type allowing at least one user within a particular space (e.g., an interior space of an automobile) to listen to a sound corresponding to the type.

In operation S403, the processor 110 may determine the location of a user by using a sensor.

According to an embodiment of the present disclosure, the processor 110 may determine the location of a sensor having detected a sensing signal among the multiple sensors.

For example, when a sensor is mounted to a seat in an interior area of an automobile, if a user sits down on a seat, the sensor mounted to the seat may generate a sensing signal. The processor 110 may determine the location of the seat from which the sensing signal has been detected. In addition, the processor 110 may determine, as the location of the user, the location of the seat from which the sensing signal has been detected.

In operation S405, the processor 110 may determine a first area based on the location determined through the sensor. For example, the processor 110 may determine, as the first area, an area corresponding to the location of a sensor having detected a sensing signal among the multiple sensors. In addition, the processor 110 may determine, as the first area, an area corresponding to an average location of sensors having detected sensing signals among the multiple sensors.

In operation S407, the processor 110 may output a first sound through the audio output apparatus 160 or 161 so as to be focused on the first area.

Figure 5:
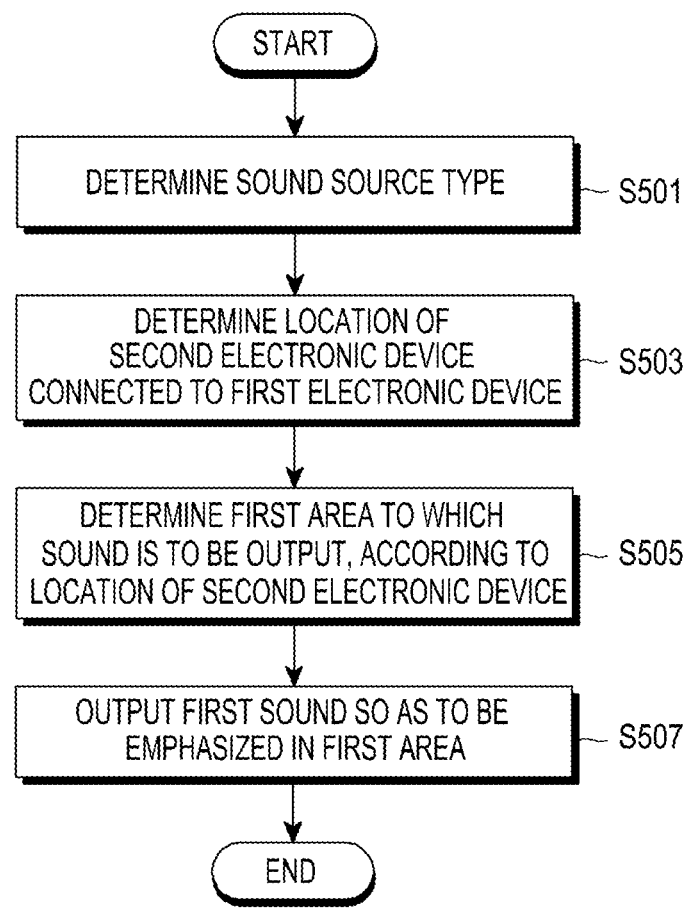
FIG. 5 is a flowchart illustrating an operating method of an electronic device according to various embodiments of the present disclosure.

FIG. 5 is a flowchart illustrating an operating method of an electronic device according to various embodiments of the present disclosure.

Referring to FIG. 5, in operation S501, the processor 110 may determine the type of a sound source to be output through the audio output apparatus 160 or 161.

In operation S503, the processor 110 may determine the location of the second electronic device 200 connected to the communication module 120. For example, when a sound source type is useful to only a particular user, the processor 110 may determine the location of the particular user.

Meanwhile, the communication module 120 may include a beacon terminal that outputs a beacon signal. The second electronic device 200 may transmit a response signal in response to a beacon signal output from the beacon terminal. At this time, the processor 110 may determine the location of the second electronic device 200 based on the response signal transmitted by the second electronic device 200.

In operation S505, the processor 110 may determine a first area to which a sound is to be output, according to the location of the second electronic device 200 to which the processor 110 is connected through the communication module 120. For example, the first area may be an area corresponding to the location of the second electronic device 200. For example, the processor 110 may determine, as the location of the particular user, the location of the second electronic device 200 to which the processor 110 is connected through the communication module 120. In addition, the processor 110 may determine, as the first area, an area corresponding to the location of the second electronic device 200.

In operation S507, the processor 110 may output a first sound corresponding to a first sound source through the audio output apparatus 160 or 161 so as to be focused on the first area.

Figure 6:
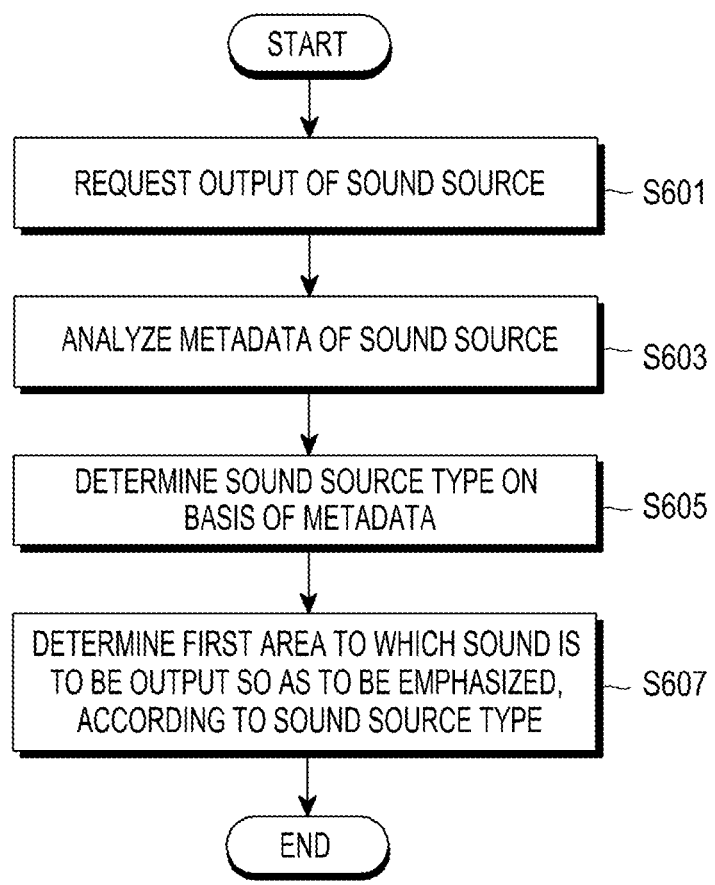
FIG. 6 is a flowchart illustrating an operating method of an electronic device according to various embodiments of the present disclosure.

FIG. 6 is a flowchart illustrating an operating method of an electronic device according to various embodiments of the present disclosure.

Referring to FIG. 6, in operation S601 the processor 110 may request the output of a sound source. For example, in response to a user input, the processor 110 may request the output of a sound source.

The processor 110 may determine the type of a sound source to be output through the audio output apparatus 160 or 161.

According to an embodiment of the present disclosure, in operation S603, in order to determine a sound source type, the processor 110 may analyze metadata of a sound source to be output through the audio output apparatus 160 or 161.

According to an embodiment of the present disclosure, metadata may include information on a sound source type. For example, metadata may include information on location, attributes, contents, use conditions, and/or use details of a sound source. The processor 110 may analyze the metadata of the sound source, and may acquire information on location, attributes, use conditions, and use details of the sound source.

In operation S605, the processor 110 may determine a sound source type based on a result of the analysis of the metadata of the sound source to be output through the audio output apparatus 160 or 161.

According to an embodiment of the present disclosure, the processor 110 may analyze metadata of a sound source, and may determine a sound source type. For example, the processor 110 may analyze metadata, and thereby may determine whether a sound source type is a navigation type, an audio type, a DMB type, or a telephone call type. Alternatively, when a result of the analysis shows that a sound source type is an audio type, the processor 110 may analyze the metadata, and thereby may determine whether an audio is an audio from a radio, an audio from an internal memory, or an audio from an external electronic device (e.g., the second electronic device 200 or a server (not illustrated)).

In operation S607, according to the sound source type, the processor 110 may determine a first area to which a sound is to be intensively output.

According to an embodiment of the present disclosure, the processor 110 may determine a first area according to the determined type of sound source by using the metadata. For example, when the metadata indicates a navigation type, the processor 110 may determine a first area to which a navigation voice is to be intensively output in a particular space (e.g., an interior space of an automobile). At this time, the first area may be an area corresponding to a front part (e.g., a part in front of a driver's seat of an automobile) within a particular space (e.g., an interior space of the automobile) so as to enable a user to listen to a navigation voice.

Alternatively, when the metadata indicates a telephone call type, the processor 110 may determine a first area to which a telephone call voice is to be intensively output. At this time, the first area may be an area corresponding to the location of the second electronic device 200 connected to the communication module 120 in order to perform a telephone call function.

Alternatively, when the metadata indicates an audio type, the processor 110 may determine a first area to which an audio-type sound is to be intensively output. For example, the first area may be an area corresponding to a central part within a particular space (e.g., an interior space of an automobile) so as to enable all users to listen to an audio-type sound.

Based on the metadata, the processor 110 may output a sound through the audio output apparatus 160 or 161 so as to be focused on the first area.

Figure 7:
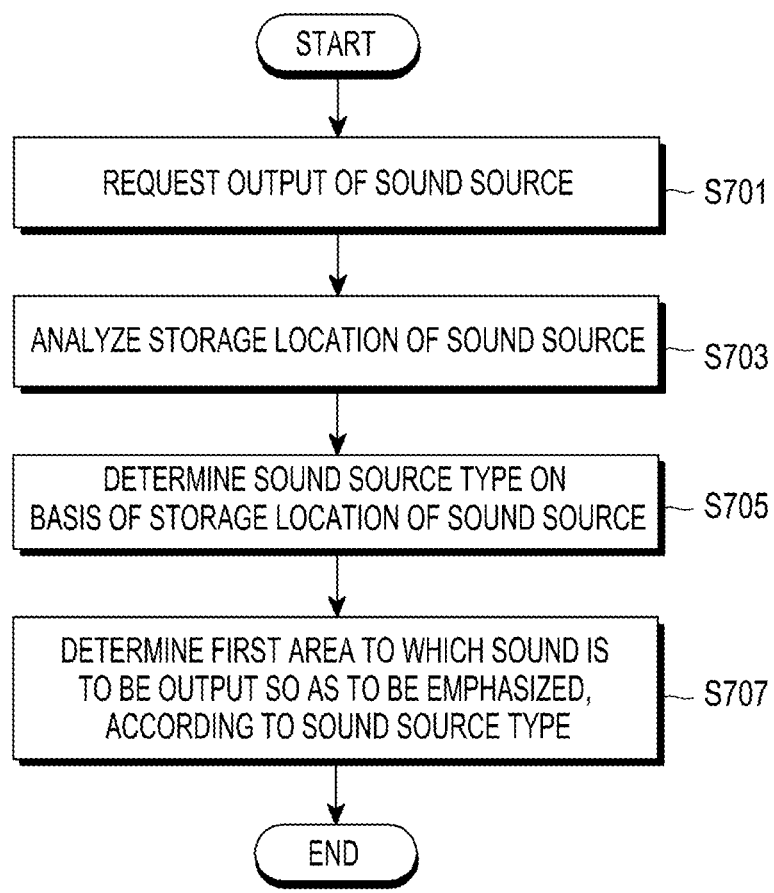
FIG. 7 is a flowchart illustrating an operating method of an electronic device according to various embodiments of the present disclosure.

FIG. 7 is a flowchart illustrating an operating method of an electronic device according to various embodiments of the present disclosure.

Referring to FIG. 7, in operation S701 the processor 110 may request the output of a sound source. For example, in response to a user input, the processor 110 may request the output of a sound source.

The processor 110 may determine the type of a sound source to be output through the audio output apparatus 160 or 161.

According to an embodiment of the present disclosure, in operation S703, in order to determine a sound source type, the processor 110 may analyze the storage location of a sound source to be output through the audio output apparatus 160 or 161.

For example, a sound source may be stored in the memory 140 of the first electronic device 101 or 102. Alternatively, a sound source may be stored in an external memory (not illustrated) connected to (or inserted into) the first electronic device 101 or 102. Meanwhile, a sound source may be stored in an external electronic device (e.g., the second electronic device 200 or a server (not illustrated)).

For example, the processor 110 may analyze whether a sound source to be output through the audio output apparatus 160 or 161 is in one of the memory 140, an external memory, the second electronic device 200, and a server.

In addition, the processor 110 may analyze a location at which a sound source to be output through the audio output apparatus 160 or 161 is stored among locations within the memory 140, an external memory, the second electronic device 200, and a server. For example, the processor 110 may analyze a folder (or a directory) in which a sound source to be output through the audio output apparatus 160 or 161 is stored among folders (or directories) of the memory 140, the external memory, the second electronic device 200, and the server.

In operation S705, the processor 110 may determine a sound source type based on the storage location of the sound source.

For example, the processor 110 may determine a sound source type according to whether the sound source is stored in one of the memory 140, an external memory, the second electronic device 200, and a server. Alternatively, the processor 110 may determine a sound source type according to a folder (or directory) having the sound source stored therein among folders (or directories) of the memory 140, the external memory, the second electronic device 200, and the server.

For example, the processor 110 may determine a sound source, which is stored in a navigation folder of the memory 140, as a navigation-type sound source. Alternatively, the processor 110 may determine a sound source, which is stored in a music folder of the memory 140, as an audio-type sound source.

Alternatively, the processor 110 may determine a sound source, which is stored in a server or an external memory, as an audio-type sound source. Meanwhile, the processor 110 may determine a sound source, which is transmitted to (stored in) the second electronic device 200, as a telephone call-type sound source.

In operation S707, according to the sound source, the processor 110 may determine a first area to which a sound is to be intensively output.

For example, for the sound source stored in the navigation folder of the memory 140, the processor 110 may determine an area, which corresponds to a front part within a particular space (e.g., an interior space of an automobile), as a first area.

Meanwhile, for a sound source stored in a first folder of the music folder of the memory 140, the processor 110 may determine an area, which corresponds to a front part within a particular space (e.g., an interior space of an automobile), as a first area. Alternatively, for a sound source stored in a second folder of the music folder of the memory 140, the processor 110 may determine an area, which corresponds to a rear part within a particular space (e.g., an interior space of an automobile), as a first area.

The processor 110 may output a sound through the audio output apparatus 160 or 161 so as to be focused on the first area.

Figure 8:
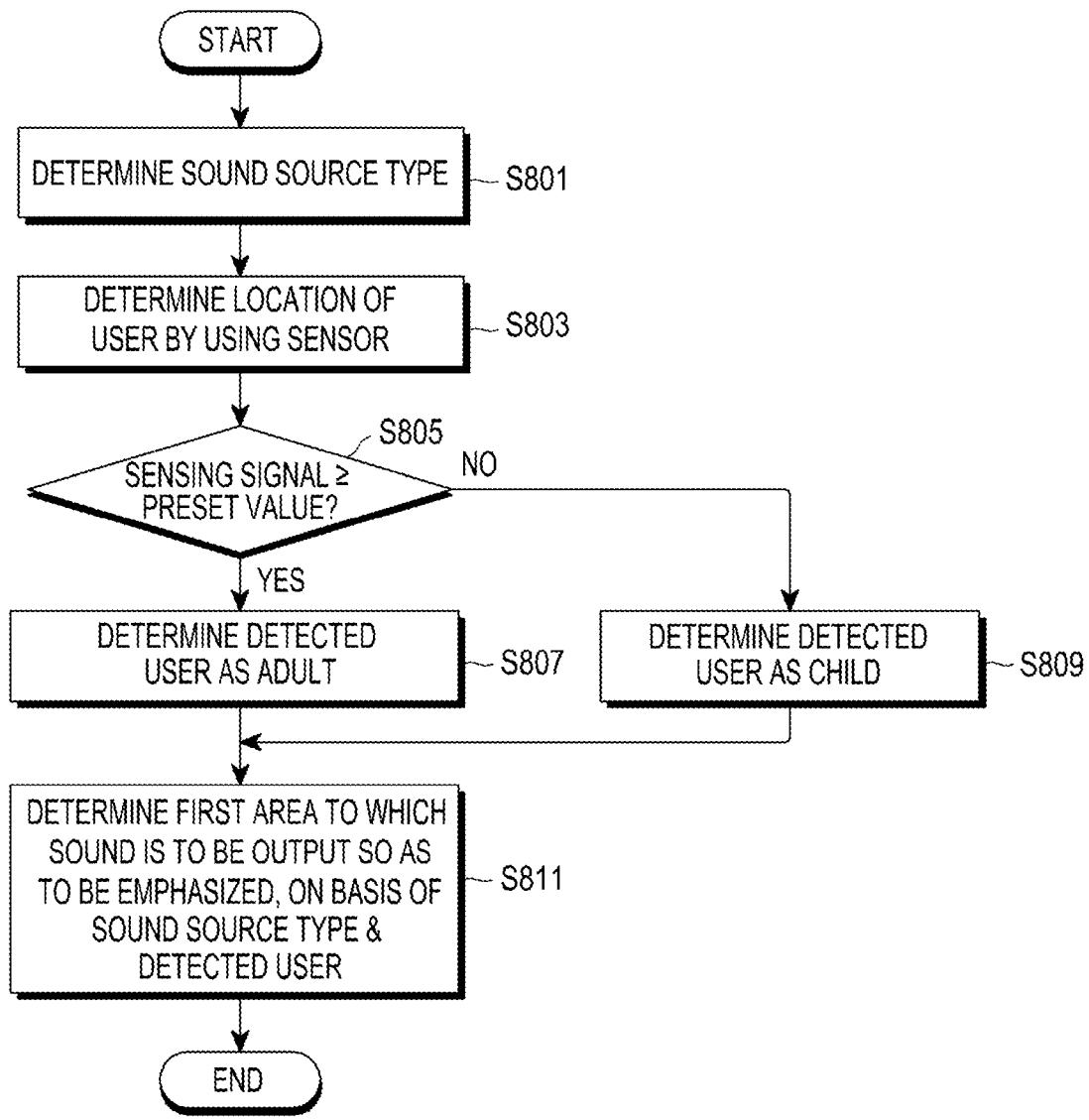
FIG. 8 is a flowchart illustrating an operating method of an electronic device according to various embodiments of the present disclosure.

FIG. 8 is a flowchart illustrating an operating method of an electronic device according to various embodiments of the present disclosure.

Referring to FIG. 8, in operation S801 the processor 110 may determine the type of a sound source to be output through the audio output apparatus 160 or 161.

In operation S803, the processor 110 may determine the location of a user by using a sensor. For example, the processor 110 may determine the location of the user based on the location of a sensor having detected a sensing signal among the multiple sensors.

The processor 110 may analyze a sensing signal detected by the sensor. For example, the processor 110 may analyze a sensing signal detected by the sensor, and thereby may determine whether the user is an adult or a child.

According to an embodiment of the present disclosure, in operation S805, the processor 110 may compare a sensing signal detected by the sensor with a preset value. Here, the preset value may signify a signal value corresponding to the weight of the user. For example, the preset value may signify a signal value corresponding to a weight of 50 kg.

When the value of the sensing signal is larger than or equal to the preset value (Yes in operation S805), in operation S807, the processor 110 may determine that the user is an adult.

When the value of the sensing signal is smaller than the preset value (No in operation S805), in operation S809, the processor 110 may determine that the user is a child.

In operation S811, the processor 110 may determine a first area according to the sound source type and the user detected by the sensing signal.

For example, when the user is determined as an adult, if the sound source type is appropriate for an adult, the processor 110 may determine the first area as an area corresponding to the location of the user. Alternatively, when the user is determined as an adult, if the sound source type is not appropriate for an adult, the processor 110 may not determine the first area as an area corresponding to the location of the user.

Similarly, when the user is determined as a child, if the sound source type is appropriate for a child, the processor 110 may determine the first area as an area corresponding to the location of the user. Alternatively, when the user is determined as a child, if the sound source type is not appropriate for a child, the processor 110 may not determine the first area as an area corresponding to the location of the user.

Figure 9:
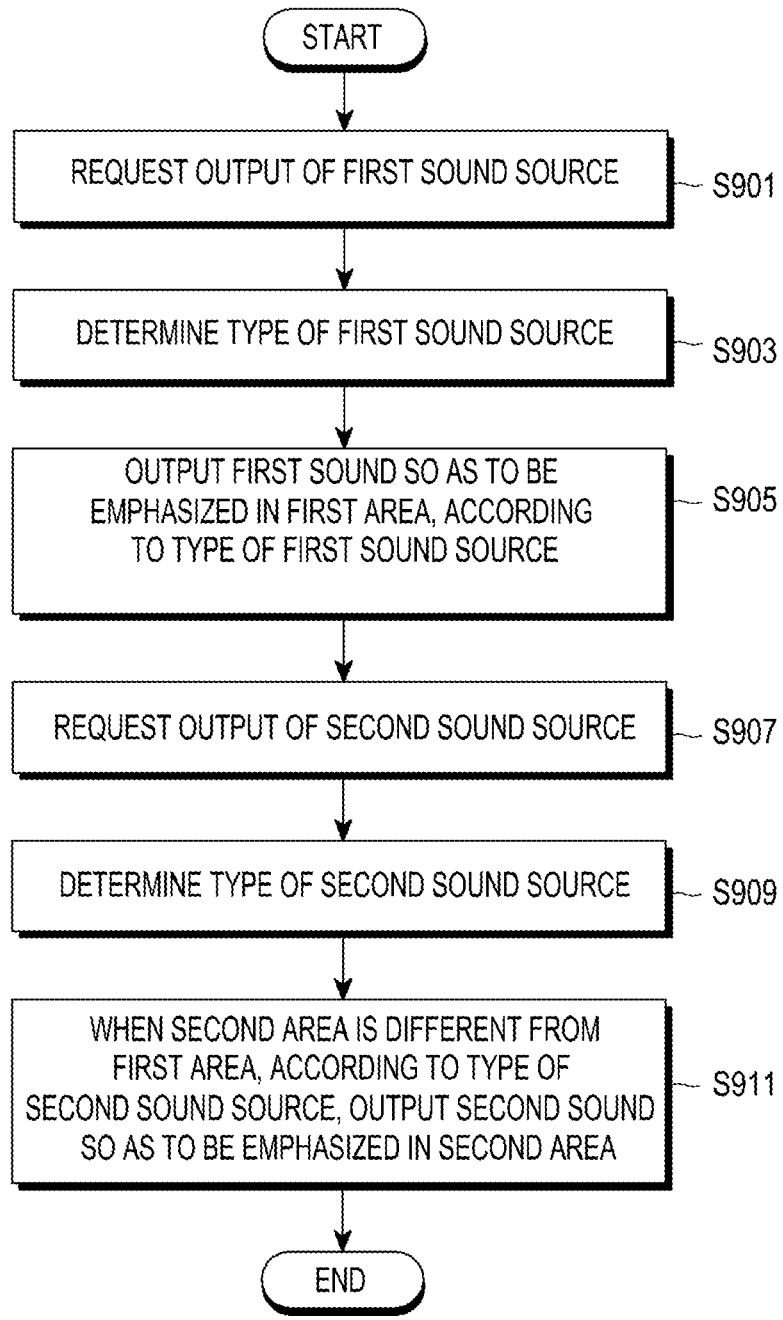
FIG. 9 is a flowchart illustrating an operating method of an electronic device according to various embodiments of the present disclosure.

FIG. 9 is a flowchart illustrating an operating method of an electronic device according to various embodiments of the present disclosure.

Referring to FIG. 9, in operation S901 the processor 110 may request the output of a first sound source. For example, in response to a user input, the processor 110 may request the output of a first sound source.

In operation S903, the processor 110 may determine the type of the first sound source to be output through the audio output apparatus 160 or 161.

The processor 110 may determine a first area according to the type of the first sound source. In addition, in operation S905, the processor 110 may output a first sound corresponding to the first sound source so as to be focused on the first area, which has been determined according to the type of the first sound source, through the audio output apparatus 160 or 161.

For example, the processor 110 may control the output intensity of each of the multiple speakers 170 or 171, which are included in the audio output apparatus 160 or 161, to output the first sound so as to be focused on the first area.

In operation S907, the processor 110 may request the output of a second sound source. For example, in response to a user input, the processor 110 may request the output of a second sound source different from the first sound source.

According to an embodiment of the present disclosure, the processor 110 may stop the reproduction of the first sound source, and may reproduce the second sound source. However, the processor 110 may reproduce the second sound source together with the reproduction of the first sound source through the audio output apparatus 160 or 161.

In operation S909, the processor 110 may determine the type of the second sound source to be output through the audio output apparatus 160 or 161.

In operation S911, according to the type of the second sound source, the processor 110 may output a second sound so as to be focused on a second area. At this time, when the second area is different from the first area, the processor 110 may simultaneously output the first sound corresponding to the first sound source and the second sound corresponding to the second sound source through the audio output apparatus 160 or 161. For example, the processor 110 may output the first sound so as to be focused on the first area, and may output the second sound so as to be focused on the second area.

When the second area is identical or similar to the first area, through the audio output apparatus 160 or 161, the processor 110 may stop the reproduction of the first sound corresponding to the first sound source, and may output the second sound corresponding to the second sound source.

However, when the first sound source has a higher priority than that of the second sound source, although the reproduction (or output) of the second sound source has been requested, the processor 110 may reproduce the first sound corresponding to the first sound source. For example, a reproduction priority of a sound source may be automatically configured by the processor 110, or may be manually configured by a user.

FIGS. 10A, 10B, 10C, and 10D are block diagrams illustrating operating methods of an electronic device according to various embodiments of the present disclosure.

Referring to FIGS. 10A, 10B, 10C, and 10D, according to a sound source type, the processor 110 may control the audio output apparatus 160 or 161 to output a sound corresponding to a sound source so as to be focused on a predetermined area within the particular space 105. For example, the audio output apparatus 160 or 161 may include multiple speakers 170-1 to 170-4.

Hereinafter, for convenience of description, the audio output apparatus 160 including the multiple speakers 170-1 to 170-4 will be described and illustrated, but the locations and number of speakers according to embodiments of the present disclosure are not limited thereto.

Figure 10A:
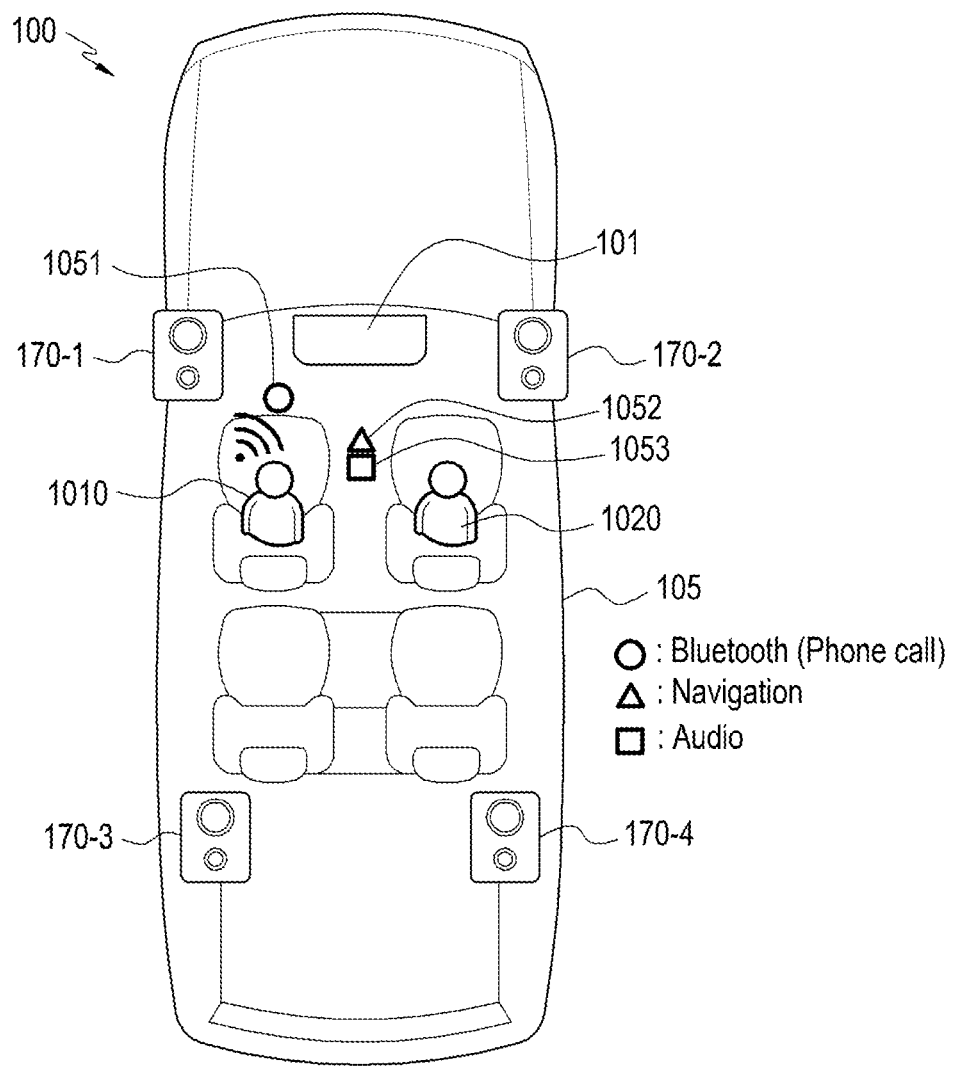
FIGS. 10A, 10B, 10C, and 10D are block diagrams illustrating operating methods of an electronic device according to various embodiments of the present disclosure.

Referring to FIG. 10A, sound source types may include a telephone call type using Bluetooth communication, a navigation type, and an audio type.

The processor 110 may detect a first user 1010 at a first location and a second user 1020 at a second location by using the multiple sensors 130. For example, when a sound source type is a telephone call type, the processor 110 may determine that a corresponding sound source is useful to only the first user 1010. When sound source types are a navigation type and an audio type, the processor 110 may determine that corresponding sound sources are useful to both the first user 1010 and the second user 1020.

In order to perform a telephone call function, the processor 110 may connect to the second electronic device 200 through the communication module 120.

When a sound source type is a telephone call type, the processor 110 may control the output intensity of each of the multiple speakers 170-1 to 170-4 to output a telephone call-type sound so as to be focused on a first area 1051. For example, the first area 1051 may correspond to the location of the first user 1010.

When the sound source type is a navigation type, the processor 110 may control the output intensity of each of the multiple speakers 170-1 to 170-4 to output a navigation-type sound so as to be focused on a second area 1052. For example, the second area 1052 may signify an intermediate area between the locations of the first user 1010 and the second user 1020.

When the sound source type is an audio type, the processor 110 may control the output intensity of each of the multiple speakers 170-1 to 170-4 to output an audio-type sound so as to be focused on a third area 1053. For example, the third area 1053 may signify an intermediate area between the locations of the first user 1010 and the second user 1020. Here, the second area 1052 may be identical or similar to the third area 1053.

Figure 10B:
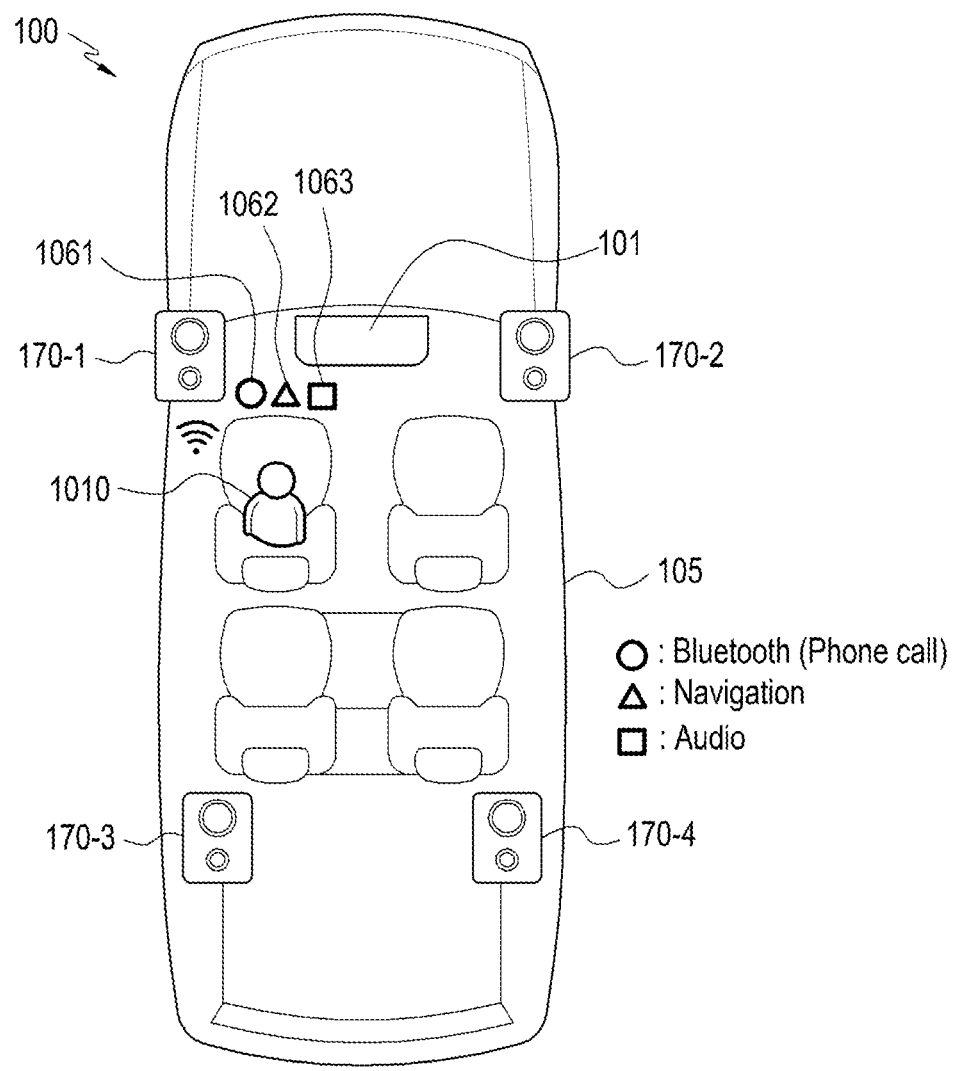

Referring to FIG. 10B, sound source types may include a telephone call type using Bluetooth communication, a navigation type, and an audio type.

The processor 110 may detect the first user 1010 at the first location by using the multiple sensors 130. For example, the processor 110 may determine that all sound sources are useful to only the first user 1010.

In order to perform a telephone call function, the processor 110 may connect to the second electronic device 200 through the communication module 120.

When a sound source type is a telephone call type, the processor 110 may control the output intensity of each of the multiple speakers 170-1 to 170-4 to output a telephone call-type sound so as to be focused on a first area 1061.

When the sound source type is a navigation type, the processor 110 may control the output intensity of each of the multiple speakers 170-1 to 170-4 to output a navigation-type sound so as to be focused on a second area 1062.

Alternatively, when the sound source type is an audio type, the processor 110 may control the output intensity of each of the multiple speakers 170-1 to 170-4 to output an audio-type sound so as to be focused on a third area 1063.

For example, the first area 1061 may correspond to the location of the first user 1010. In addition, the first area 1061, the second area 1062, and the third area 1063 may be identical or similar to one another.

Figure 10C:
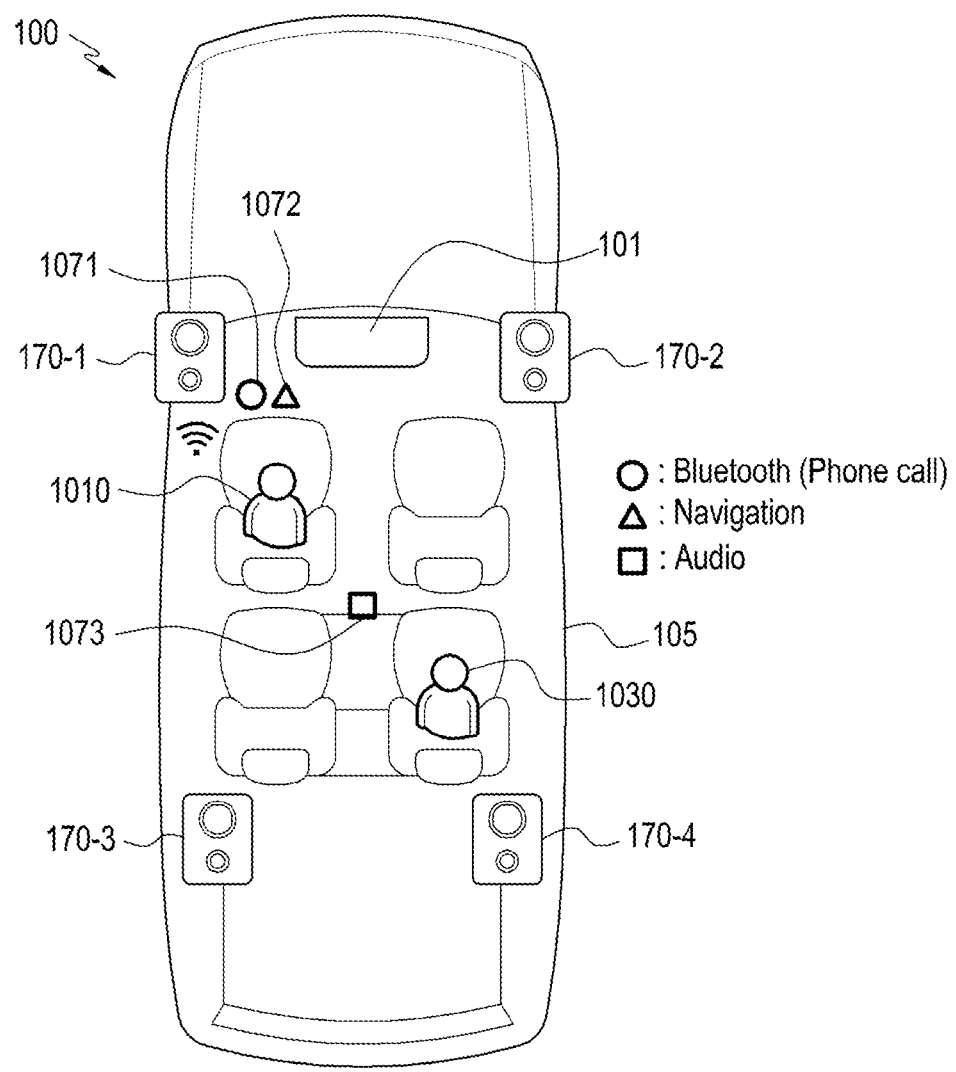

Referring to FIG. 10C, sound source types may include a telephone call type using Bluetooth communication, a navigation type, and an audio type.

The processor 110 may detect the first user 1010 at the first location and a third user 1030 at a third location by using the multiple sensors 130. For example, when sound source types are a telephone call type and a navigation type, the processor 110 may determine that corresponding sound sources are useful to only the first user 1010. When the sound source type is an audio type, the processor 110 may determine that a corresponding sound source is useful to both the first user 1010 and the third user 1030.

In order to perform a telephone call function, the processor 110 may connect to the second electronic device 200 through the communication module 120.

When a sound source type is a telephone call type, the processor 110 may control the output intensity of each of the multiple speakers 170-1 to 170-4 to output a telephone call-type sound so as to be focused on a first area 1071.

When the sound source type is a navigation type, the processor 110 may control the output intensity of each of the multiple speakers 170-1 to 170-4 to output a navigation-type sound so as to be focused on a second area 1072.

When the sound source type is an audio type, the processor 110 may control the output intensity of each of the multiple speakers 170-1 to 170-4 to output an audio-type sound so as to be focused on a third area 1073.

For example, each of the first area 1071 and the second area 1072 may correspond to the location of the first user 1010. In addition, the third area 1073 may be an intermediate area between the locations of the first user 1010 and the third user 1030.

Figure 10D:
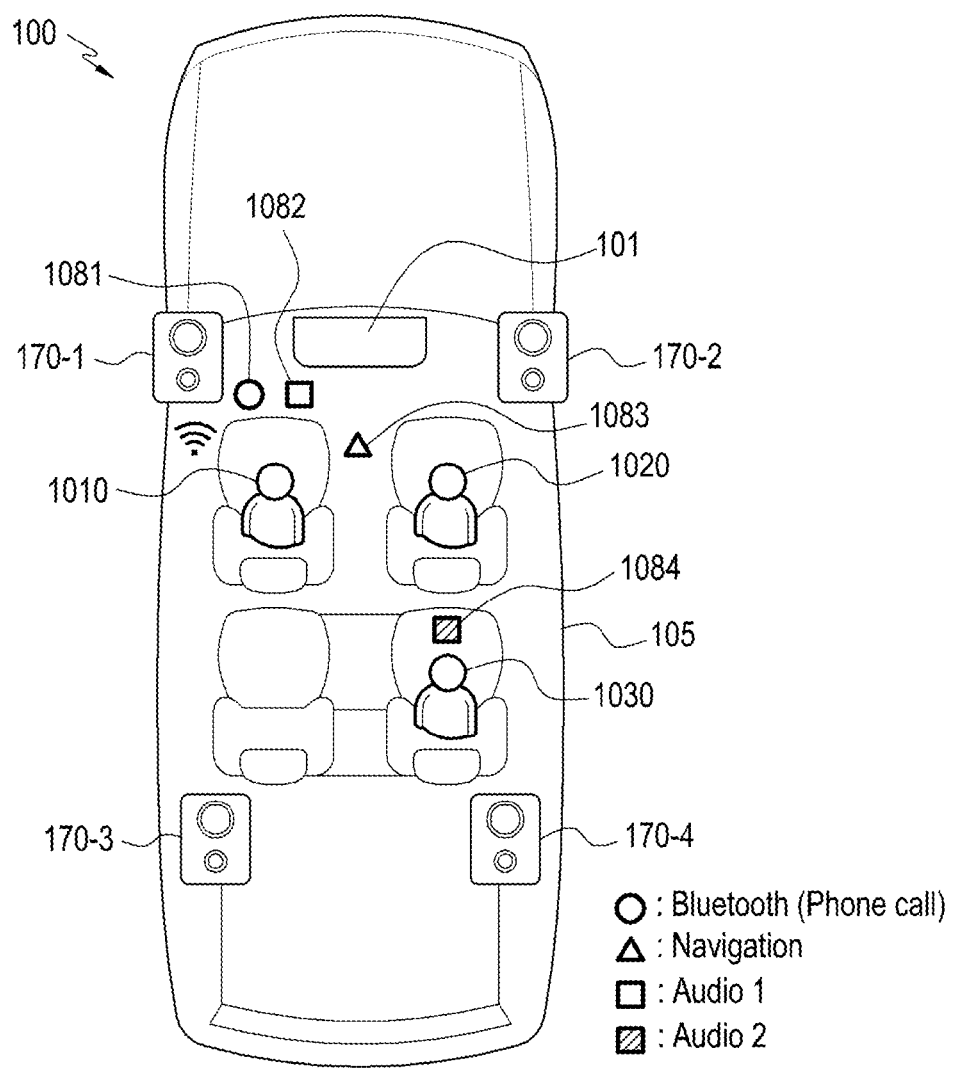

Referring to FIG. 10D, sound source types may include a telephone call type using Bluetooth communication, a navigation type, a first audio type, and a second audio type.

The processor 110 may detect the first user 1010 at the first location, the second user 1020 at the second location, and the third user 1030 at the third location by using the multiple sensors 130. For example, when sound source types are a telephone call type and a first audio type, the processor 110 may determine that corresponding sound sources are useful to only the first user 1010. When a sound source type is a navigation type, the processor 110 may determine that a corresponding sound source is useful to both the first user 1010 and the second user 1020. When the sound source type is a second audio type, the processor 110 may determine that a corresponding sound source is useful to only the third user 1030.

In order to perform a telephone call function, the processor 110 may connect to the second electronic device 200 through the communication module 120.

When a sound source type is a telephone call type, the processor 110 may control the output intensity of each of the multiple speakers 170-1 to 170-4 to output a telephone call-type sound so as to be focused on a first area 1081. Alternatively, when the sound source type is a first audio type, the processor 110 may control the output intensity of each of the multiple speakers 170-1 to 170-4 to output a first audio-type sound so as to be focused on a third area 1082.

For example, the first area 1081 and the third area 1082 may correspond to the location of the first user 1010. In addition, the first area 1081 may be identical or similar to the third area 1082.

When the sound source type is a navigation type, the processor 110 may control the output intensity of each of the multiple speakers 170-1 to 170-4 to output a navigation-type sound so as to be focused on a second area 1083. For example, the second area 1083 may be an intermediate area between the locations of the first user 1010 and the second user 1020.

Alternatively, when the sound source type is a second audio type, the processor 110 may control the output intensity of each of the multiple speakers 170-1 to 170-4 to output a second audio-type sound so as to be focused on a fourth area 1084. For example, the fourth area 1084 may correspond to the location of the third user 1030.

Meanwhile, since the first area 1081 may be different from the fourth area 1084, the processor 110 may control the multiple speakers 170-1 to 170-4 to simultaneously output a first sound of a first audio type, which is a first sound source type, and a second sound of a second audio type which is a second sound source type.

Figure 11A:
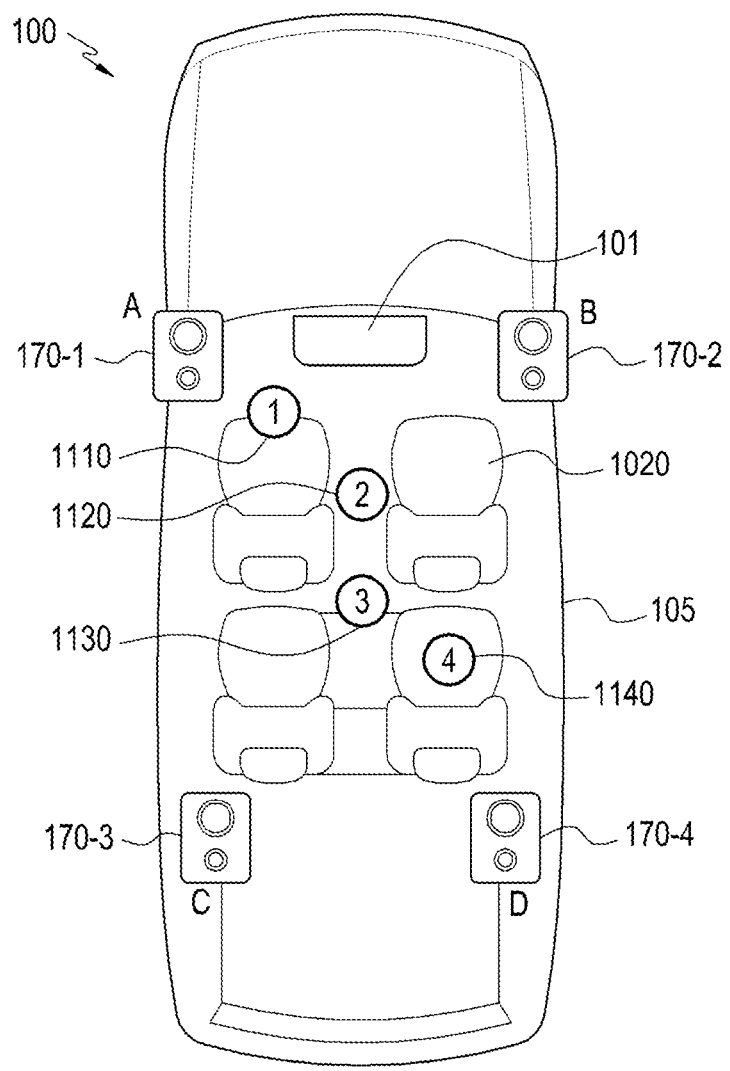

FIGS. 11A and 11B illustrate an operation of an electronic device for controlling each of multiple speakers according to various embodiments of the present disclosure.

Referring to FIG. 11A, the processor 110 may control the output intensities of the multiple speakers 170-1 to 170-4 to output a sound corresponding to a sound source so as to be focused on predetermined areas 1110, 1120, 1130, and 1140 within the particular area 105.

Referring to FIG. 11B, the processor 110 may control output intensities of the multiple speakers 170-1 to 170-4. For example, the processor 110 may control output weights 1150 of the first speaker 170-1, the second speaker 170-2, the third speaker 170-3, and the fourth speaker 170-4 among the multiple speakers 170-1 to 170-4. In this case, the processor 110 may assume that a typical speaker has an output weight of 1.

For example, when a sound is intensively output to the first area 1110, the processor 110 may control such that the first speaker 170-1 has an output weight of 3.5, such that the second speaker 170-2 has an output weight of 0.5, and such that the third and fourth speakers 170-3 and 170-4 both have an output weight of 0.

For example, when a sound is intensively output to the second area 1120, the processor 110 may control such that the first and second speakers 170-1 and 170-2 both have an output weight of 1.5, and such that the third and fourth speakers 170-3 and 170-4 both have an output weight of 0.5.

For example, when a sound is intensively output to the third area 1130, the processor 110 may control such that the first, second, third, and fourth speakers 170-1, 170-2, 170-3, and 170-4 all have an output weight of 1.

For example, when a sound is intensively output to the fourth area 1140, the processor 110 may control such that the first and second speakers 170-1 and 170-2 both have an output weight of 0, such that the third speaker 170-3 has an output weight of 0.5, and such that the fourth speaker 170-4 has an output weight of 3.5.

Figure 12:
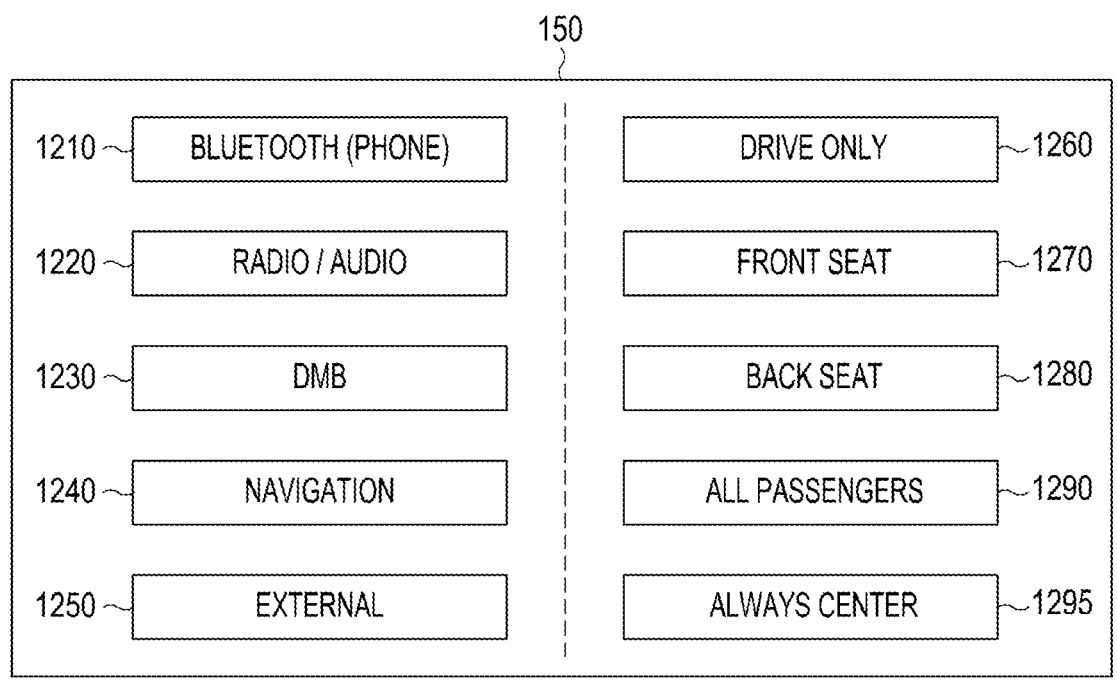
FIG. 12 is a block diagram illustrating a configuration of a user interface provided by an electronic device according to various embodiments of the present disclosure.

FIG. 12 is a block diagram illustrating a configuration of a user interface provided by an electronic device according to various embodiments of the present disclosure.

Referring to FIG. 12, in response to a user input (e.g., a touch input), the processor 110 may determine a first area corresponding to a sound source type.

The processor 110 may display, on the display 150, a user interface including a sound source type and areas to which a sound corresponding to a sound source is intensively output.

For example, sound source types may include a telephone call type 1210, a radio/audio type 1220, a DMB type 1230, a navigation type 1240, and an external device type 1250.

For example, a first area to which a sound corresponding to a sound source is intensively output may signify one of a driver area 1260, a front seat area 1270, a back seat area 1280, an all passengers' area 1290, and an always-center-area 1295.

For example, referring to FIG. 11A, the driver area 1260 may signify the first area 1110, the front seat area 1270 may signify the second area 1120, the back seat area 1280 may signify the fourth area 1140, the all passengers' area 1290 may signify an average area of users detected by sensors, and the always-center-area 1295 may signify the third area 1130.

For example, in response to a user input, the processor 110 may control the audio output apparatus 160 or 161 to output a sound of the telephone call type 1210 so as to be focused on the driver area 1110 or 1260.

In response to a user input, the processor 110 may control the audio output apparatus 160 or 161 to output a sound of the radio/audio type 1220 so as to be focused on the always-center-area 1130 or 1295.

In response to a user input, the processor 110 may control the audio output apparatus 160 or 161 to output a sound of the navigation type 1240 so as to be focused on the front seat area 1120 or 1270.

Figure 13:
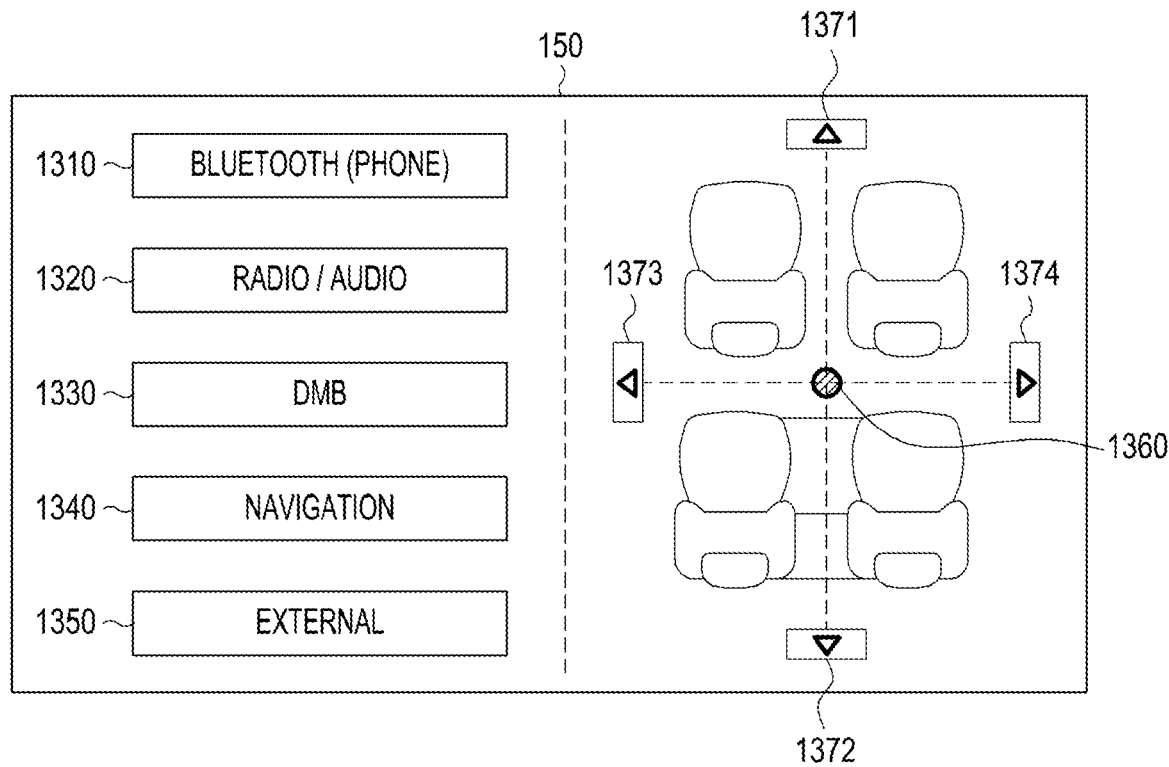
FIG. 13 is a block diagram illustrating a configuration of a user interface provided by an electronic device according to various embodiments of the present disclosure.

FIG. 13 is a block diagram illustrating a configuration of a user interface provided by an electronic device according to various embodiments of the present disclosure.

Referring to FIG. 13, in response to a user input (e.g., a touch input), the processor 110 may determine a first area corresponding to a sound source type.

The processor 110 may display, on the display 150, a user interface including a sound source type and a first area 1360 to which a sound corresponding to a sound source is intensively output.

For example, sound source types may include a telephone call type 1310, a radio/audio type 1320, a DMB type 1330, a navigation type 1340, and an external device type 1350.

The processor 110 may display the first area 1360, to which a sound corresponding to a sound source is intensively output, within the particular space 105 through the user interface displayed on the display 150. In addition, in response to a user input, the processor 110 may set the location of the first area 1360 corresponding to the sound source.

The processor 110 may adjust the location of the first area 1360 corresponding to the sound source in response to an input indicating an upward direction 1371, a downward direction 1372, a left direction 1373, and a right direction 1374.

The processor 110 may display the first area 1360, of which the location has been adjusted in response to the user input, through the user interface displayed on the display 150.

For example, when a sound source type is the navigation type 1340, in response to a user input, the processor 110 may adjust the first area 1360. In response to a user input, as the first area to which a sound of the navigation type 1340 is to be intensively output, the processor 110 may configure a center area 1360.

Figure 14:
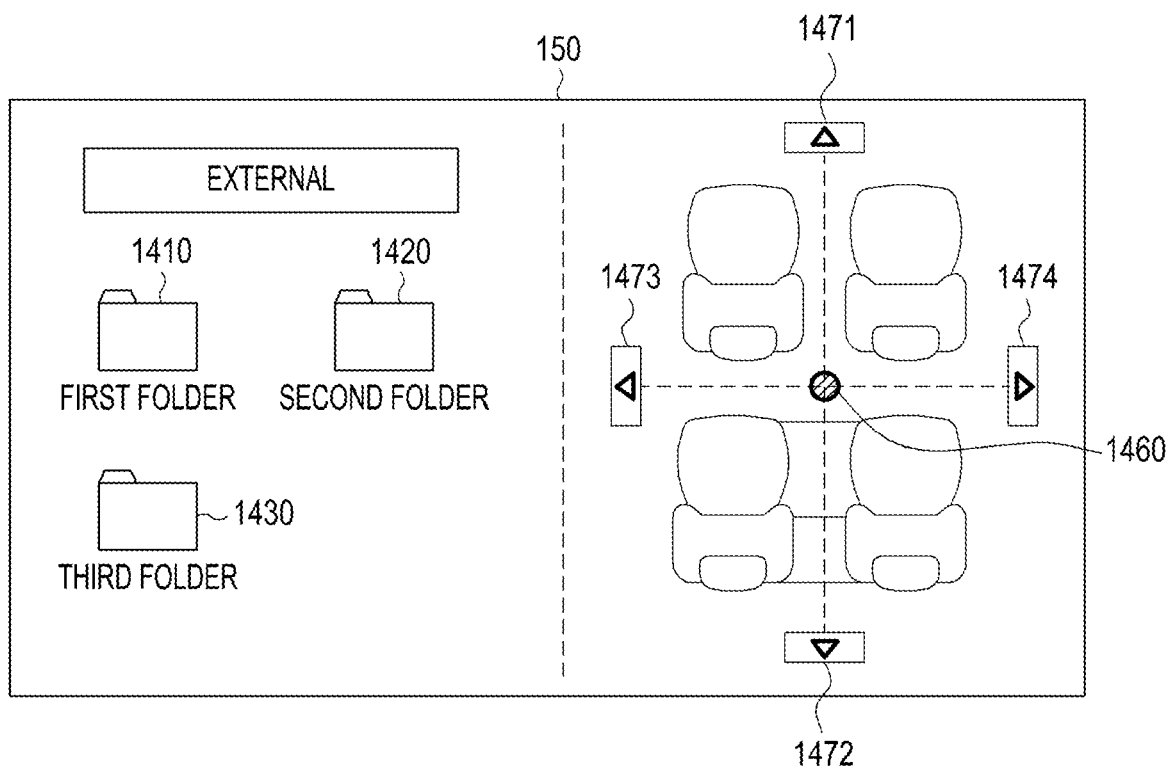
FIG. 14 is a block diagram illustrating a configuration of a user interface provided by an electronic device according to various embodiments of the present disclosure.

FIG. 14 is a block diagram illustrating a configuration of a user interface provided by an electronic device according to various embodiments of the present disclosure.

Referring to FIG. 14, in response to a user input (e.g., a touch input), the processor 110 may configure (or determine) a first area corresponding to a sound source type.

The processor 110 may display, on the display 150, a user interface including a sound source type and a first area to which a sound corresponding to a sound source is intensively output. In addition, in response to a user input, the processor 110 may configure the location of a first area 1460 corresponding to a sound source.

The processor 110 may adjust the location of the first area 1460 corresponding to the sound source in response to an input indicating an upward direction 1471, a downward direction 1472, a left direction 1473, and a right direction 1474.

According to an embodiment of the present disclosure, the processor 110 may determine a sound source type according to the storage location of a sound source stored in an external memory (not illustrated) or an external electronic device (e.g., the second electronic device 200) connected to the first electronic device 101 or 102.

For example, the external memory may include a first folder 1410, a second folder 1420, and a third folder 1430.

For example, the processor 110 may determine that a sound source stored in the first folder 1410 of the external memory is a first audio-type sound source, a sound source stored in the second folder 1420 thereof is a second audio-type sound source, and a sound source stored in the third folder 1430 thereof is a third audio-type sound source.

Referring to FIG. 11A, the processor 110 may control the audio output apparatus 160 or 161 to output the sound source stored in the first folder 1410 so as to be focused on the first area 1110. Alternatively, the processor 110 may control the audio output apparatus 160 or 161 to output the sound source stored in the second folder 1420 so as to be focused on the third area 1130. Alternatively, the processor 110 may control the audio output apparatus 160 or 161 to output the sound source stored in the third folder 1430 so as to be focused on the fourth area 1140.

Meanwhile, the processor 110 may adjust the location of the first area 1460 corresponding to the sound source in response to an input indicating an upward direction 1371, a downward direction 1372, a left direction 1373, and a right direction 1374.

The processor 110 may display the first area 1460, of which the location has been adjusted in response to the user input, through the user interface displayed on the display 150. For example, when a sound source is stored in the first folder 1410, in response to a user input, the processor 110 may change the existing first area 1110 to the first area 1460 through the adjustment of a location.

A first electronic device according to various embodiments of the present disclosure may include an audio output apparatus, and a processor configured to, according to a type of a first sound source to be output through the audio output apparatus, control an output of the audio output apparatus to output a first sound corresponding to the first sound source so as to be focused on a first area.

The audio output apparatus may include multiple speakers, and the processor may determine the first area according to the type of the first sound source and may control an intensity of an output of each of the multiple speakers according to the determined first area.

The first electronic device may further include a communication module, wherein the processor may determine an area, in which a second electronic device connected to the communication module is located, as the first area according to the type of the first sound source.

The electronic apparatus may further include multiple sensors, wherein the first area may be determined based on the type of the first sound source and a location of a sensor having detected a sensing signal among the multiple sensors.

The processor may determine an area, which corresponds to an average location of the sensors having detected the sensing signals among the multiple sensors, as the first area according to the type of the first sound source.

The processor may compare a sensing value of the sensor having detected the sensing signal among the multiple sensors with a preset value, and may determine the first area according to a result of the comparison.

The processor may cause the first speaker from among the multiple speakers to output the first sound corresponding to the first sound source so as to be focused on the first area, according to the type of the first sound source, and may cause the second speaker from among the multiple speakers to output a second sound corresponding to a second sound source so as to be focused on a second area different from the first area, according to a type of the second sound source to be output through the audio output apparatus.

The first electronic device may further include a memory, wherein the processor may determine the type of the first sound source according to a location within the memory at which the first sound source is stored.

The processor may determine the type of the first sound source based on metadata included in the first sound source.

The first sound sources may include an audio, a radio, a navigation, a phone call, and a DMB.

An operating method of a first electronic device, according to various embodiments of the present disclosure, may include determining a type of a first sound source to be output through an audio output apparatus, and controlling an output of the audio output apparatus to output a first sound corresponding to the first sound source so as to be focused on a first area, according to the determined type of the first sound source.

The determining of the type of the first sound source may include: determining the first area according to the type of the first sound source, and controlling an intensity of an output of each of multiple speakers included in the audio output apparatus, according to the determined first area.

The determining of the first area may include determining an area, in which a second electronic device connected to the first electronic device is located, as the first area according to the type of the first sound source.

The determining of the first area may include determining the first area based on the type of the first sound source and a location of a sensor having detected a sensing signal among multiple sensors.

The determining of the first area may include determining an area, which corresponds to an average location of sensors having detected sensing signals among multiple sensors, as the first area according to the type of the first sound source.

The determining of the first area may include comparing a sensing value of the sensor having detected the sensing signal among the multiple sensors with a preset value, and determining the first area according to a result of the comparison.

The operating method may further include: causing the first speaker from among multiple speakers to output the first sound corresponding to the first sound source so as to be focused on the first area, according to the type of the first sound source, and causing the second speaker from among the multiple speakers to output a second sound corresponding to a second sound source so as to be focused on a second area different from the first area, according to a type of the second sound source to be output through the audio output apparatus.

The determining of the type of the first sound source may include determining the type of the first sound source according to a location within a memory of the first electronic device at which the first sound source is stored.

The determining of the type of the first sound source may include determining the type of the first sound source based on metadata included in the first sound source.

A recording medium according to various embodiments of the present disclosure may store a computer program for performing operations including determining a type of a first sound source to be output through an audio output apparatus, and controlling an output of the audio output apparatus to output a first sound corresponding to the first sound source so as to be focused on a first area, according to the determined type of the first sound source.

An electronic device according to various embodiments of the present disclosure may include a communication device, and a processor configured to transmit, through the communication module, a control signal for, according to a type of a first sound source to be output through an audio output apparatus, controlling an output of the audio output apparatus to output a first sound corresponding to the first sound source so as to be focused on a first area.

The processor may determine the first area according to the type of the first sound source and may transmit the control signal for controlling an intensity of an output of each of multiple speakers, which are included in the audio output apparatus, according to the determined first area.

The electronic apparatus may further include multiple sensors, wherein the processor may determine the first area based on the type of the first sound source and a location of a sensor having detected a sensing signal among the multiple sensors.

The processor may determine an area, which corresponds to an average location of the sensors having detected the sensing signals among the multiple sensors, as the first area according to the type of the first sound source.

The processor may determine the type of the first sound source based on metadata included in the first sound source.

Each of the above-described elements of the electronic device may include one or more components, and the names of the corresponding elements may vary based on the type of electronic device. In various embodiments of the present disclosure, the electronic device may include at least one of the above-described elements, and may further include other additional elements, or some of the above-described elements may be omitted from the electronic device. In addition, some of the elements of the electronic device according to various embodiments of the present disclosure may be combined into one entity, which may perform functions identical to those of the relevant elements before the combination thereof.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus of a first electronic device, the electronic apparatus comprising:
   a memory;
   an audio output apparatus including a plurality of speakers; and
   a processor configured to:
      identify a type of a first sound source to be output through the audio output apparatus,
      identify a location of at least one user in a specific space using multiple sensors,
      identify a first area for outputting a first sound corresponding to the first sound source, based on the type of the first sound source and the location of the at least one user, and
      control an output of the audio output apparatus to output the first sound so as to be focused on the first area,
   wherein the processor is further configured to:
      identify the location of the at least one user based on a physical quantity and operation state sensing signal from at least one of the multiple sensors by a contact of the at least one user, and
      identify the type of the first sound source according to a location within the memory at which the first sound source is stored.

2. The electronic apparatus of claim 1, wherein the processor is further configured to:
   control an intensity of the output of each of the plurality of speakers based on the first area.

3. The electronic apparatus of claim 1,
   wherein the first electronic device further comprises a communication device, and
   wherein the processor is further configured to:
      identify an area in which a second electronic device connected to the communication device is located, and identify the first area based on the type of the first sound source, the location of the at least one user, and the area in which the second electronic device is located.

4. The electronic apparatus of claim 1, wherein the first area is identified based on the type of the first sound source and a location of a sensor having detected the sensing signal among the multiple sensors.

5. The electronic apparatus of claim 4, wherein the processor is further configured to identify an area, which corresponds to an average location of the multiple sensors having detected the sensing signals among the multiple sensors, as the first area based on the type of the first sound source.

6. The electronic apparatus of claim 4, wherein the processor is further configured to:
compare a sensing value of the sensor having detected the sensing signal among the multiple sensors with a preset value, and
identify the first area based on a result of the comparison.

7. The electronic apparatus of claim 2, wherein the processor is further configured to:
control a first speaker from among the plurality of speakers to output the first sound corresponding to the first sound source so as to be focused on the first area, based on the type of the first sound source, and
control a second speaker from among the plurality of speakers to output a second sound corresponding to a second sound source so as to be focused on a second area different from the first area, based on a type of the second sound source to be output through the audio output apparatus.

8. The electronic apparatus of claim 1, wherein the processor is further configured to identify the type of the first sound source based on metadata included in the first sound source.

9. The electronic apparatus of claim 1, wherein the first sound source comprises at least one of an audio, a radio, a navigation, a phone call, or a digital multimedia broadcasting (DMB).

10. An operating method of a first electronic device, the method comprising:
identifying a type of a first sound source to be output through an audio output apparatus;
identifying a location of at least one user in a specific space using multiple sensors;
identifying a first area for outputting a first sound corresponding to the first sound source, based on the type of the first sound source and the location of the at least one user; and
controlling an output of the audio output apparatus to output the first sound so as to be focused on the first area,
wherein identifying the location includes identifying the location of the at least one user based on a physical quantity and operation state sensing signal from at least one of the multiple sensors by a contact of the at least one user,
wherein the controlling of the output of the audio output apparatus comprises controlling an intensity of the output of each of a plurality of speakers included in the audio output apparatus, based on the first area, and
wherein the identifying of the first area comprises identifying an area, which corresponds to an average location of sensors having detected sensing signals among multiple sensors, as the first area based on the type of the first sound source.

11. The method of claim 10, wherein the identifying of the first area comprises:
identifying an area, in which a second electronic device connected to the first electronic device is located; and
identifying the first area based on the type of the first sound source, the location of the at least one user, and the area in which the second electronic device is located.

12. The method of claim 10, wherein the identifying of the first area comprises identifying the first area based on the type of the first sound source and a location of a sensor having detected the sensing signal among multiple sensors.

13. The method of claim 12, wherein the identifying of the first area further comprises:
comparing a sensing value of the sensor having detected the sensing signal among the multiple sensors with a preset value; and
identifying the first area based on a result of the comparison.

14. The method of claim 10, further comprising:
controlling a first speaker from among a plurality of speakers to output the first sound corresponding to the first sound source so as to be focused on the first area, based on the type of the first sound source; and
controlling a second speaker from among the plurality of speakers to output a second sound corresponding to a second sound source so as to be focused on a second area different from the first area, based on a type of the second sound source to be output through the audio output apparatus.

15. The method of claim 10, wherein the identifying of the type of the first sound source comprises identifying the type of the first sound source based on a location within a memory of the first electronic device at which the first sound source is stored.

16. The method of claim 10, wherein the identifying of the type of the first sound source comprises identifying the type of the first sound source based on metadata included in the first sound source.

17. An operating method of an electronic device, the method comprising:
identifying a type of a first sound source to be output through an audio output apparatus;
identifying a location of at least one user in a specific space using multiple sensors;
identifying a first area for outputting a first sound corresponding to the first sound source, based on the type of the first sound source and the location of the at least one user; and
controlling an output of the audio output apparatus to output the first sound so as to be focused on the first area,
wherein identifying the location includes identifying the location of the at least one user based on a physical quantity and operation state sensing signal from at least one of the multiple sensors by a contact of the at least one user, and
wherein the identifying of the type of the first sound source comprises identifying the type of the first sound source based on a location within a memory of the electronic device at which the first sound source is stored.

* * * * *